United States Patent [19]
Burns et al.

[11] Patent Number: 5,657,326
[45] Date of Patent: Aug. 12, 1997

[54] RADIO BASED COLLISION DETECTION FOR WIRELESS COMMUNICATION SYSTEM

[75] Inventors: Lawrence M. Burns, Mountain View; Allen Podell, Palo Alto; David A. Fisher, Menlo Park; Ravi Ramachandran, San Jose, all of Calif.

[73] Assignee: 3Com Corporation, Santa Clara, Calif.

[21] Appl. No.: 359,539

[22] Filed: Dec. 20, 1994

[51] Int. Cl.⁶ .............................. H04J 3/24; H04L 12/413
[52] U.S. Cl. ........................ 370/349; 370/445; 375/303
[58] Field of Search .......................... 370/32, 85.2, 85.3, 370/94.1, 95.1, 95.3, 310, 329, 341, 349, 445; 375/272, 303, 334

[56] References Cited

U.S. PATENT DOCUMENTS

| | | | |
|---|---|---|---|
| 4,336,541 | 6/1982 | Tsui et al. | 343/18 |
| 4,719,458 | 1/1988 | Miesterfeld et al. | 370/85.2 |
| 4,747,101 | 5/1988 | Akaiwa et al. | 370/95 |
| 4,807,222 | 2/1989 | Amitay | 370/85 |
| 4,866,788 | 9/1989 | Mouly et al. | 455/9 |
| 4,876,742 | 10/1989 | Vacon et al. | 455/66 |
| 4,975,926 | 12/1990 | Knapp | 375/1 |
| 5,029,183 | 7/1991 | Tymes | 375/1 |
| 5,040,175 | 8/1991 | Tuch et al. | 370/85.2 |
| 5,099,346 | 3/1992 | Lee et al. | 359/118 |
| 5,103,461 | 4/1992 | Tymes | 375/1 |
| 5,123,029 | 6/1992 | Bantz et al. | 375/1 |
| 5,142,550 | 8/1992 | Tymes | 375/1 |
| 5,157,687 | 10/1992 | Tymes | 375/1 |
| 5,164,942 | 11/1992 | Kamerman et al. | 370/94.1 |
| 5,166,929 | 11/1992 | Lo | 370/85.3 |
| 5,181,200 | 1/1993 | Harrison | 370/85.1 |
| 5,220,564 | 6/1993 | Tuch et al. | 370/94.1 |
| 5,231,634 | 7/1993 | Giles et al. | 370/95.1 |
| 5,274,841 | 12/1993 | Natarajan et al. | 370/94.1 |
| 5,276,703 | 1/1994 | Budin et al. | 375/1 |
| 5,280,498 | 1/1994 | Tymes et al. | 375/1 |
| 5,339,316 | 8/1994 | Diepstraten | 370/85.13 |
| 5,369,639 | 11/1994 | Kamerman et al. | 370/85.3 |
| 5,379,290 | 1/1995 | Kleijne | 371/85.2 |
| 5,422,887 | 6/1995 | Diepstraten et al. | 370/85.3 |

FOREIGN PATENT DOCUMENTS 0 594 458 A2  4/1994  European Pat. Off. .

OTHER PUBLICATIONS

Tsui, "Microwave Receivers With Electronic Warfare Applications", published by John Wiley & Sons, pp. 212–214.
Tsui, et al., "Instantaneous Simultaneous Signal Detecting", *Microwave Journal*, Dec., 1982, pp. 118–119 and 122.

*Primary Examiner*—Hassan Kizou

[57] ABSTRACT

A collision detection method and apparatus which is suitable for use in a wireless CSMA/CD network, or other wireless networks where collision detection is provided. The apparatus includes a detector which detects intermodulation or other mixing products of colliding data transmissions at a station in the network, and a signal processor which indicates collisions between the data transmissions based upon characteristics of the intermodulation products. The system is capable of detecting collisions, both between transmissions from the station on which the device is located and transmissions from other sources, and between two transmissions being received from other sources. The station includes a transmitter having an input for a data packet. Resources coupled to the input add a header to the data packet, the header having characteristics monitored by the collision detector circuitry including a pseudo-random bit sequence. Data transmission signals are supplied to the transmitter in response to the header and the data packet. Thus, collisions occurring during transmission of the header sequence have intervals during which a mismatch occurs between the colliding signal and the data transmission.

36 Claims, 15 Drawing Sheets

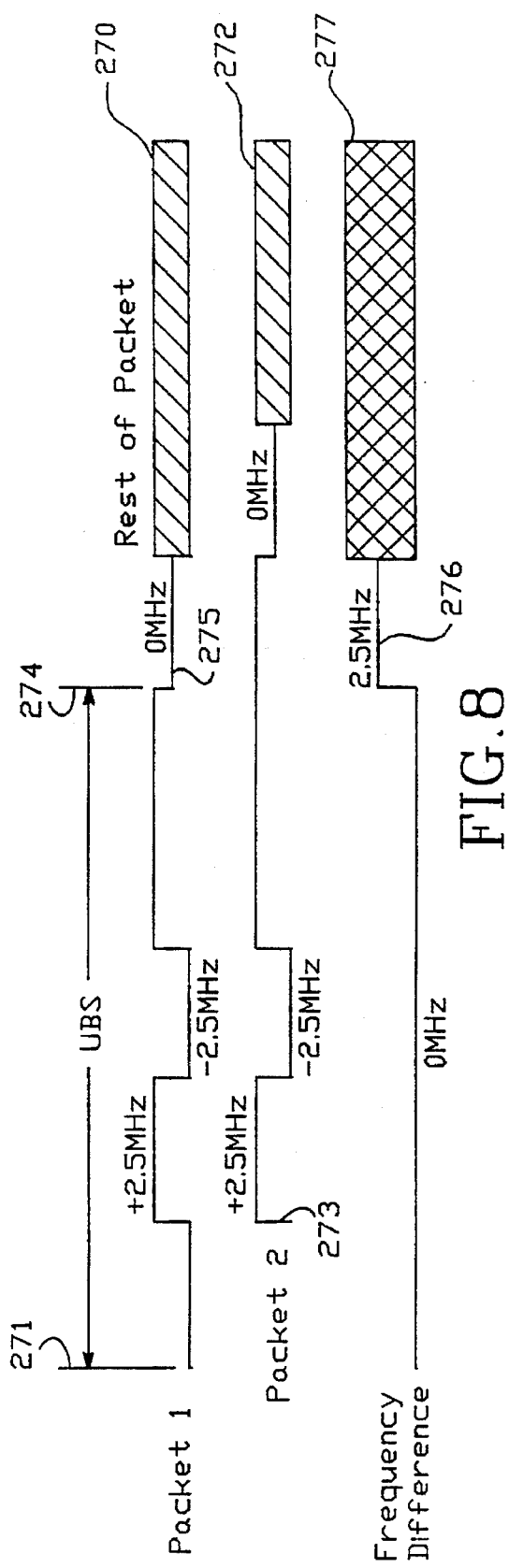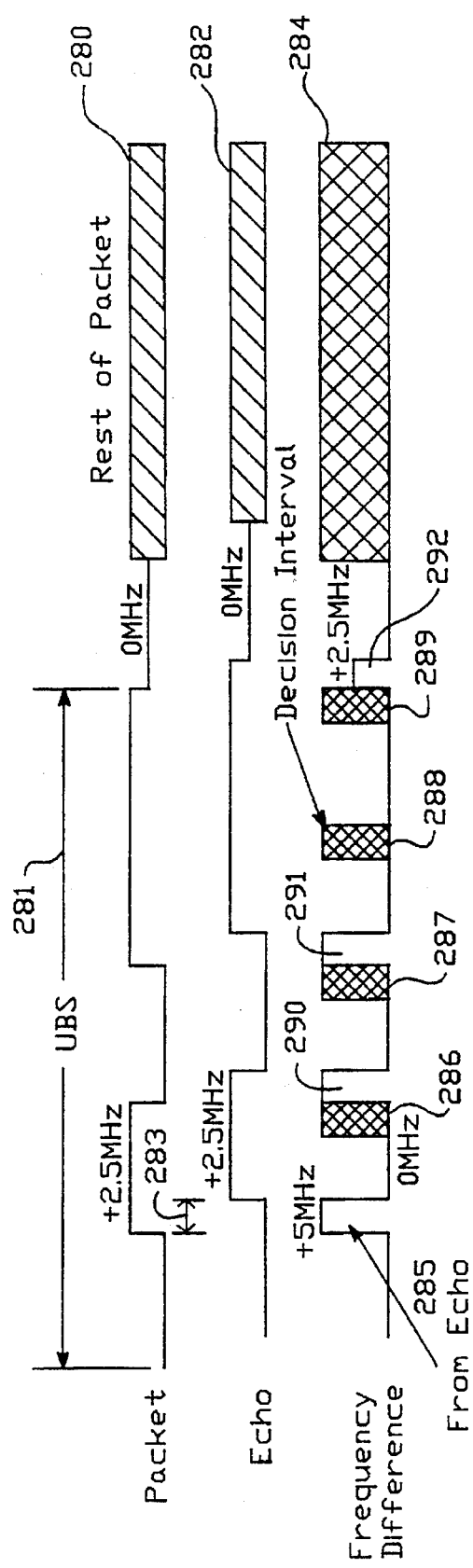

RADIO BASED COLLISION DETECTION FOR WIRELESS COMMUNICATION SYSTEM

BACKGROUND OF THE INVENTION

1. Field of the Invention

The present invention relates to wireless communication systems; and more particularly to detecting collisions between data packets in wireless communication channels which rely on a collision detection protocol.

2. Description of Related Art

One common network protocol is based on the so-called carrier sense, multiple access with collision detection technique (CSMA/CD). This technique is used, for instance, in wired Ethernet standard LANs which are in widespread use. However, this protocol has not been successfully applied to wireless channels.

In the wireless environment, a transmitting signal from a station will have a level much higher than the weakest received signal that might be valid within a basic service area of transmission. For instance, in one application, the transmitting signal is issued at 0 dBm, while the weakest received signal, which is expected to be valid, will be detected at a level of −75 dBm, resulting in a ratio of 31.6 million to 1 in power. During transmission of a signal, detecting the presence of a signal millions of times smaller in magnitude is quite difficult.

The CSMA/CD protocol operates under several fundamental assumptions a. Control of access to the media is distributed among all users on the network.

b. Medium behavior is well defined (deterministic) and constant (not stochastic).

c. Equal and full connectivity.

d. Listen before talk (Carrier Sense part).

e. Once data transmission is initiated, if a collision is detected, all parties stop transmitting and go into a random back off mode before retransmitting.

The highest utilization of the bandwidth, with the lowest protocol overhead, is maintained because once the collision is detected, it is recoverable without wasting network bandwidth by allowing all the colliding parties to transmit to completion.

The CSMA/CD protocol has one other fascinating attribute. It scales well under heavy load. For instance, the higher the demand for bandwidth (due to large number of users, or high traffic requirements), the higher the probability will be of packet collisions. The IEEE 802.3 (Ethernet) protocol does not exhibit extreme performance degradation under these conditions; other protocols do.

In a well tuned environment, efficiency numbers above 90% are obtainable. Without collision detection (the CSMA/CA—Collision Avoidance situation), much lower efficiency numbers ranging between 18% and 30% are obtainable because bandwidth is wasted as collisions are allowed to run to completion.

Most wireless developers believed that true wireless collision detection was not obtainable. This belief arises because the mechanism used to detect a collision on a wire (i.e., looking for a dc offset on the wire) does not translate to the wireless environment.

To compensate for this problem, several alternative medium access control (MAC) protocols have been developed. They all share the fundamental characteristic of a "reservation." This technique attempts to reserve either bandwidth (time or frequency), or hardware, for each individual user, to guarantee collisions do not occur.

The following is a representative, but not inclusive, list of common MAC protocols to compensate for the differences between the wired and wireless medium, they are:

a. Time Division Multiple Access b. Code Division Multiple Access c. Frequency Division Multiple Access d. Reservation Based Systems such as Request to Send/Clear to Send/Acknowledgment (RTS/CTS/Ack).

The problems with these techniques are that they require one central Point Coordination Function (PCF) to handle "reservation" requirements (a, b, and c), or some form of collision period (d). The result is a very high protocol overhead. For instance, prior art systems burn roughly 50% to 60% of bandwidth with protocol overhead, in some cases. In addition, the overhead problem is complicated under heavy load conditions.

Accordingly, it is desirable to provide a technique for true collision detection in a wireless environment, to enable more efficient protocols, such as CSMA/CD.

SUMMARY OF THE INVENTION

The present invention provides a collision detection method and apparatus which is suitable for use in a wireless CSMA/CD network, or other wireless networks where collision detection is important. The apparatus includes a detector which detects products caused by mixing of colliding data transmissions at a station in the network, and a signal processor which indicates collisions between the data transmissions based upon characteristics of the detected products. The system is capable of detecting collisions, both between a transmission from the station on which the device is located and a transmission from other sources, and between two transmissions being received from other sources.

According to one aspect, the transmitter includes an amplifier having a non-linear response to colliding signals which produces, for example, intermodulation products. The detector includes a filter coupled to the transmitter which passes an intermodulation product characteristic of colliding data transmissions to the signal processing resources. The collision detect signal is produced by the signal processing resources in response to the amplitude of the intermodulation product passed by the filter.

In addition, the present invention provides a receiver including a non-linear device which produces intermodulation products. A filter coupled to the non-linear device passes an intermodulation or other mixing product characteristic of colliding data transmissions from other sources. Signal processing resources generate a collision detect signal when the amplitude of the mixing product passed by the filter on the receiver exceeds a threshold.

In one implementation, the transmissions comprise frequency modulated carrier having a center frequency, a lower frequency below the center frequency representing a first data value, and a higher frequency above the center frequency representing a second data value. The signal processing resources are responsive to a product based on the difference between the low frequency and the high frequency.

According to another aspect of the invention, the station includes a transmitter having an input for a data packet. Resources coupled to the input add a header to the data packet, the header having characteristics monitored by the collision detector circuitry. Data transmission signals are supplied to the transmitter in response to the header and the data packet.

The header comprises a sequence, called an unambiguous bit sequence UBS, assigned to the transmitter is intended to be different than the sequence assigned to other transmitters in the wireless link. Thus, collisions occurring during transmission of the header sequence have intervals during which a mismatch such as a frequencing mismatch occurs between the colliding signal and the data transmission. The transmitter has a range which has a characteristic echo settling time, which may be longer than a bit period during which a single bit of data is characteristically transmitted. In this aspect, the header comprises a sequence of symbols, each symbol having a data value and lasting for a plurality of bit periods longer than the echo settling time.

Further, the transmitter may include a filter or other components which must settle before reliable collision detection can be made. The symbols in the header last longer than this characteristic circuit settling time.

In one embodiment, the present invention can be characterized as a station for wireless link in a CSMA/CD network. This station comprises a transmitter including an amplifier to supply a data transmission in response to a data transmission signal. An input receives a digital data packet for transmission, and resources coupled to the input apply a header to the digital data packet. Frequency modulation circuitry coupled to the input supplies a data transmission signal to the amplifier which comprises a carrier frequency modulated in response to the header and the digital data packet. A transmit collision detector is coupled to the transmitter. It detects intermodulation products of the data transmission from the amplifier and signals from other sources received during the transmission.

A receiver is also included in the station which includes a non-linear device producing intermodulation products of data transmissions received from other sources. A receive collision detector is coupled to the receiver, and detects intermodulation products characteristic of collisions between data transmissions from other sources. The signal processing resources are coupled to the transmit collision detector and the receive collision detector, and indicate collisions between data transmissions based upon characteristics of the detected intermodulation products.

The present invention can also be characterized as a method for detecting collisions in a station on a wireless link of a network operating a carrier sense multiple access with collision detection protocol. The method includes applying a header to data packets to be transmitted on the wireless link which includes a sequence that is resistant to interference by echoes. Next, the method includes producing intermodulation or other mixing products in the station between data transmissions by the station and signals from other sources. Finally, the method includes processing the intermodulation products to detect collisions between data transmissions.

Accordingly, the system for detecting collisions between transmissions in a wireless communication network has been provided. This system enables the use of a CSMA/CD protocol in a wireless environment. Using this system, the standard Ethernet CSMA/CD protocol can be extended to wireless stations. Furthermore, a reliable, efficient wireless network technique is possible.

Other aspects and advantages of the present invention can be seen upon review of the figures, the detailed description, and the claims which follow.

BRIEF DESCRIPTION OF THE FIGURES

FIG. 8 illustrates the operation of the wireless header with two packets that are transmitted slightly offset in time, but which have a unique bit sequence which matches during the overlapping transmission.

FIG. 9 illustrates the effect of echoes or internal filter settling times on the wireless header according to the present invention.

DETAILED DESCRIPTION

A detailed description of a preferred embodiment of the present invention is provided with respect to the figures.

Figure 1:
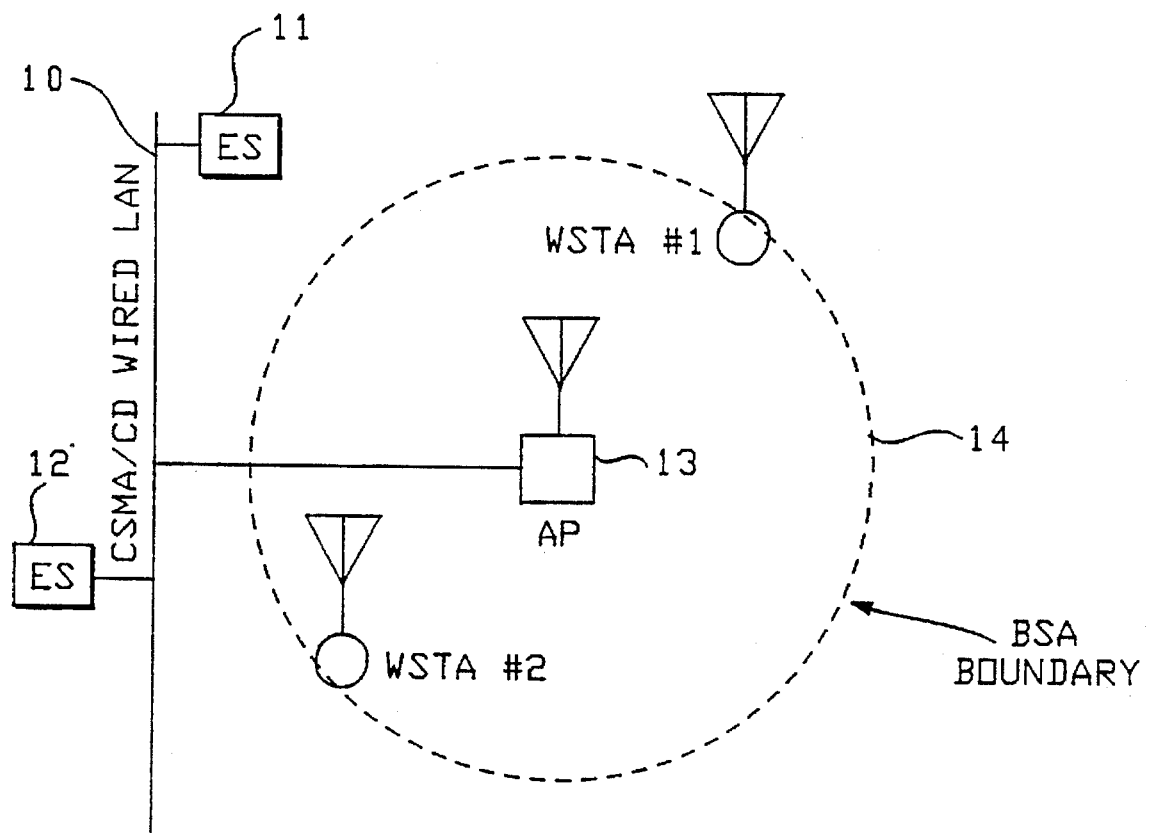
FIG. 1 is a schematic diagram of a communication system including a CSMA/CD wireless link according to the present invention.

FIG. 1 shows a local area network including a wireless link according to the present invention. The system includes a CSMA/CD wired LAN 10, such as a standard Ethernet system. Coupled to the wired LAN are a plurality of end stations 11, 12 as is standard in the art. Also, coupled to the wired LAN 10, is an access point 13 for communication with wireless stations, including wireless station WSTA 1 and wireless station WSTA 2. The access point has a typical range having a boundary as illustrated by the dotted line 13, which is defined by the receiver and transmitter technology used to define a basic service area.

Although a variety of communication channel technologies could be used, the preferred system according to the present invention is implemented using a relatively narrow band frequency modulated NRZ channel in the 2.4 GHz ISM band. The channel bandwidth in the preferred system is between 7 and 14 MHz. This channel allocation system allows for allocating a plurality of channels within the ISM band for adjacent basic service areas.

According to the CSMA/CD protocol, in order to gain control of the communication channel, each wireless station must establish that no other stations are currently transmitting. Thus, the status of the receivers is checked to determine whether the carrier is free. If the carrier is free, then it begins transmitting. It is possible that two stations within the BSA will attempt to transmit at or near the same time under this protocol. Thus, a mechanism to detect collisions between simultaneous or near simultaneous transmissions is needed, such as is well known in the wired Ethernet LAN environment. However, this presents unique difficulties in the wireless environment.

Figure 2:
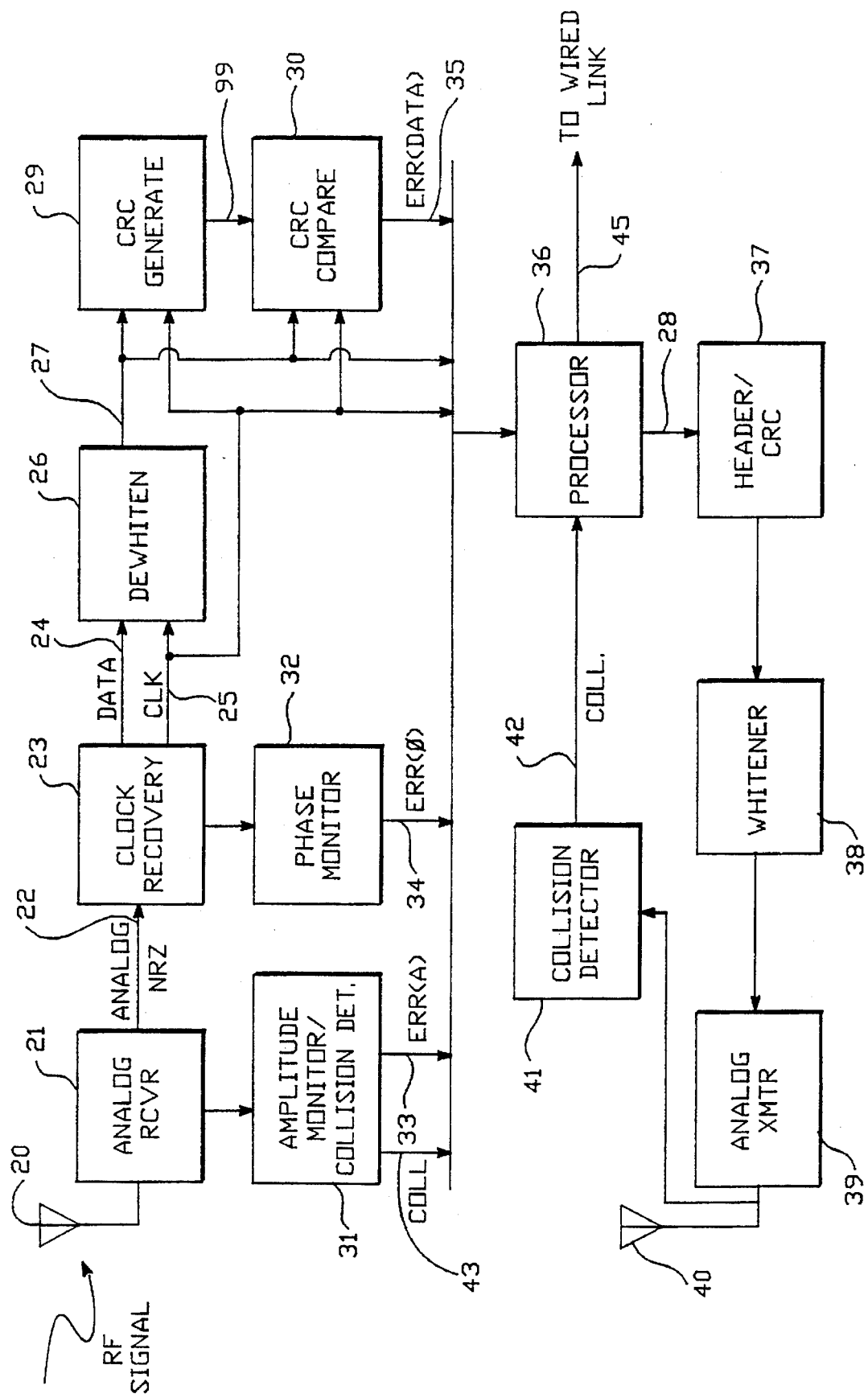
FIG. 2 is a schematic block diagram of a wireless station according to the present invention.

FIG. 2 provides a block diagram of a wireless station according to the present invention. The wireless station includes an antenna 20 coupled to an analog receiver 21. The analog receiver produces an analog NRZ signal on line 22 which is applied to the clock recovery circuit 23. The clock recovery circuit produces a data signal on line 24 and a clock signal on line 25 which are supplied to a dewhitening circuit 26. The dewhitening circuit outputs a dewhitened data signal on line 27.

The data on line 27 and clock on line 25 are supplied to a CRC generation circuit 29. Also, the signals on lines 27 and 25 are supplied through a CRC compare circuit 30, which compares the CRC supplied by the generate circuit 29 across line 99 with the CRC in the encapsulated packet. The CRC compare circuit 30 generates a data error signal on line 35 in the event the CRC in the received packet does not match the CRC generated by the generate circuit 29.

In addition, coupled to the analog receiver 21 is an amplitude monitor and collision detector 31. The circuit 31 monitors the amplitude of the received signal to detect anomalies which are typical of erroneous data, and produces an amplitude error signal 33 when the amplitude of the received signal varies in an anomalous manner typical of erroneous data. Also, intermodulation products on the received signal which are typical of colliding transmissions are detected. If a collision is detected, then a collision signal is applied on line 43 to the processor 36.

A phase monitor circuit 32 is coupled with the clock recovery circuit 23 according to the present invention which monitors changes in phase in transitions in the NRZ data stream 22. Phase monitor 33 generates a phase error signal on line 34 in the event an anomaly in phase of the NRZ data stream is detected which is typical of erroneous data.

The data on line 27, the clock on line 28, and the error signals on lines 33, 34 and 35 are supplied to a processor 36. The processor 36 passes the received data frame for higher protocol level processing and possibly on line 45 to a wired segment of the LAN. Also, if an error signal or collision signal is received, the processor 36 produces a collision detected, or retry, packet to send to the source of the packet. Further, the processor 36 may generate its own packets to be transmitted and supply such packets on line 28. A wireless header and wireless CRC are applied to a packet on line 28 in a wireless header and CRC generation block 37. The encapsulated wireless packet is applied to a whitener circuit 38 which whitens the NRZ data to increase the number of transitions in the packet to assist clock recovery at the receiver. The encapsulated wireless packet is then applied to an analog transmitter 39 and coupled into the medium through antenna 40. The antennae 20 and 40 could be the same antenna, or antenna system, shared between the transmitter and receiver.

Coupled to the antenna 40 or the transmitter 39 is a collision detector 41. The collision detector 41 monitors the state of the transmit antenna 40 during transmissions to detect collisions based on intermodulation products produced by the mixing of the transmitted signal from the analog transmitter 39 and signals received from other sources on the antenna 40. Using information about the known characteristics of transmitted data packets, such as the header described below, within the wireless network, the intermodulation products can be analyzed to detect particular characteristics of the intermodulation products which indicate a collision between digital data signals transmitted in the wireless link. If a collision is detected, then a signal is produced on line 42 and supplied to the processor 36. The processor then executes a backoff and retry sequence, such as the common backoff and retry sequences executed in Ethernet local area networks.

As is described in one detailed example below, the wireless header produced in block 38 has characteristics which enhance the intermodulation products detected by the detector during collision.

Figure 3:
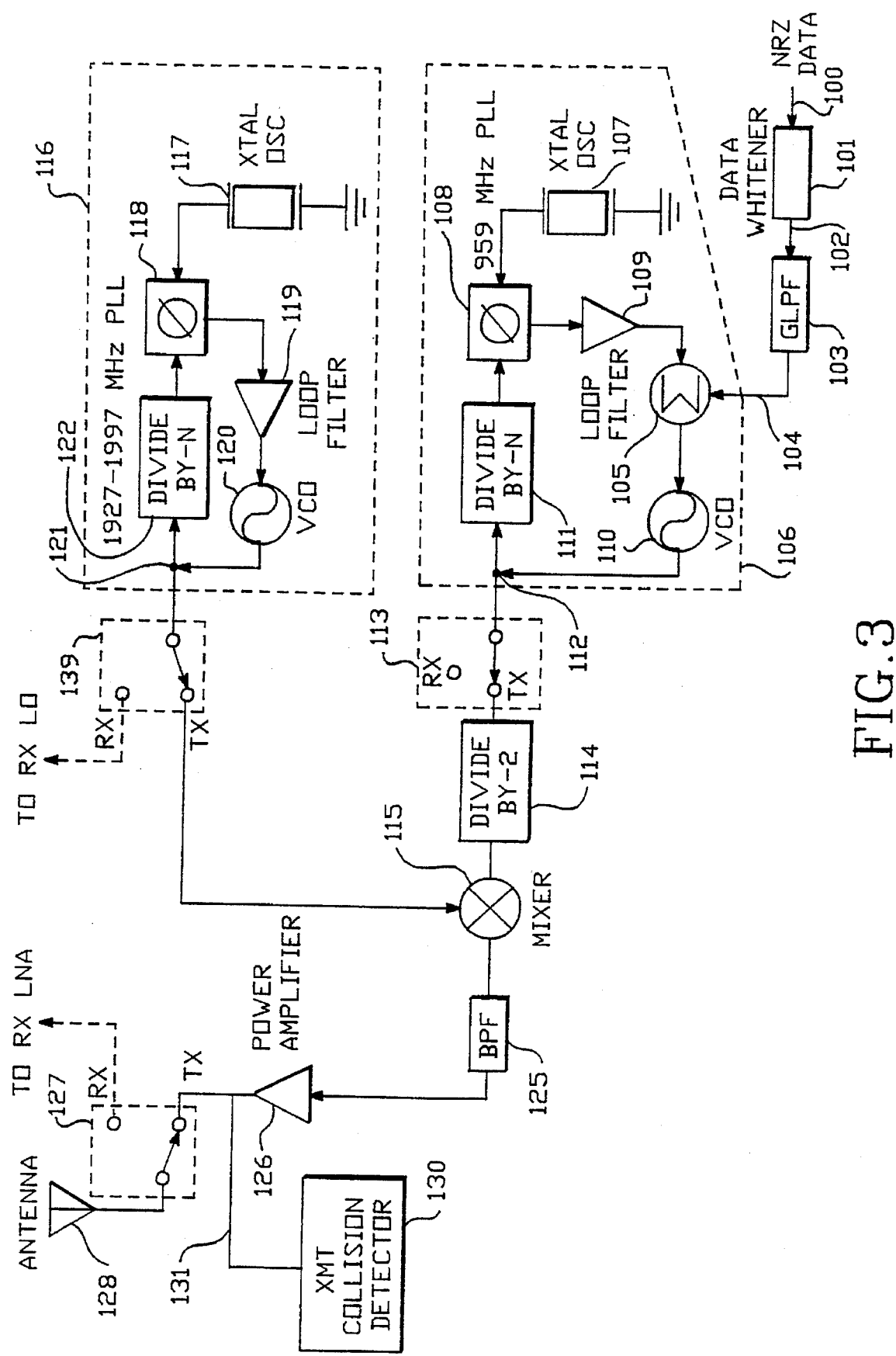
FIG. 3 is a schematic diagram of a transmitter according to the present invention.

A transmitter for the preferred system can be understood with respect to FIG. 3. The transmitter receives NRZ input data on line 100. It is applied to a data whitener 101 which produces a NRZ stream on line 102 having an increased number of data transitions. This signal is applied to a gaussian low pass filter 103 which produces a frequency modulation signal on line 104 which is coupled to a summing junction 105 in a phase locked loop 106. The phase locked loop 106 is coupled to a crystal oscillator 107. The output of the oscillator 107 is coupled to a phase detector 108. The output of the phase detector drives a loop filter 109. The output of the loop filter 109 is mixed with the data signal from line 104 in summing junction 105. The output of the summing junction 105 drives the voltage controlled oscillator 110. The output of the voltage controlled oscillator is supplied to a divide-by-N circuit 111. The output of the divide-by-N circuit 111 is supplied as input to the phase detector 108 to complete the phase locked loop. The output of the phase locked loop is supplied on node 112 at the output of the voltage controlled oscillator 110. This signal is coupled through a switch generally 113 which is operated in the transmit position in the example shown, and coupled into a divide-by-2 circuit 114. The output of the divide-by-2 circuit is applied to a mixer 115.

The transmitter includes a second phase locked loop 116 which is driven by a crystal oscillator 117. The output of the crystal oscillator 117 is applied to a phase detector 118. The output of the phase detector 118 is supplied to a loop filter 119 which drives a voltage controlled oscillator 120. The output of the voltage controlled oscillator 120 is applied to node 121 as the output of the phase locked loop, and back to a divide-by-N circuit 122 which is supplied as input to the phase detector 118. The phase locked loop 116 operates at 1.927 to 1.997 MHz depending on the particular channel in which the transmitter is operating.

The output of the phase locked loop 116 is applied to a switch generally 139 which is set in a transmit position in this drawing. The output of the switch 139 in the transmit position is coupled to the mixer 115, where it is mixed with the output of the divide-by-2 circuit 114. This mixer supplies a signal through a bandpass filter 125. The output of the bandpass filter 125 is supplied to a power amplifier 126 and coupled through a switch 127 to the transmit antenna 128.

Thus, the transmitter consists of two independent phase locked loops 106, 116. Each phase locked loop is locked to a crystal oscillator frequency reference. The phase locked loop 116 provides a frequency reference for the channel in which the transmitter operates. The phase locked loop 106 provides a modulated offset frequency which is added to the reference from phase locked loop 116 during transmit. The switches 139 and 113 allow switching between transmit and receive modes within a few microseconds. Thus, in this case, a frequency of 479.5 MHz (equal to the intermediate band frequency) is added to a signal of slightly less than 2 MHz to set up the communication channel.

Maintaining the phase locked loop 106 at 959 MHz allows this loop to remain free running during the receive mode without interfering with the intermediate band processing in the receiver. The signal is divided by two during transmit only.

As mentioned before, the data is passed through a whitening or scrambling circuit prior to the gaussian low pass filter 103. The whitener insures that the NRZ data stream has no DC component. This assists keeping the phase locked loop 106 locked to the channel center frequency.

Heuristically, at the output of the power amplifier 126, the collision detector 130 is tapped into the signal line across line 131. More details concerning the implementation of the collision detector 130 are provided below with respect to FIG. 5.

Figure 4:
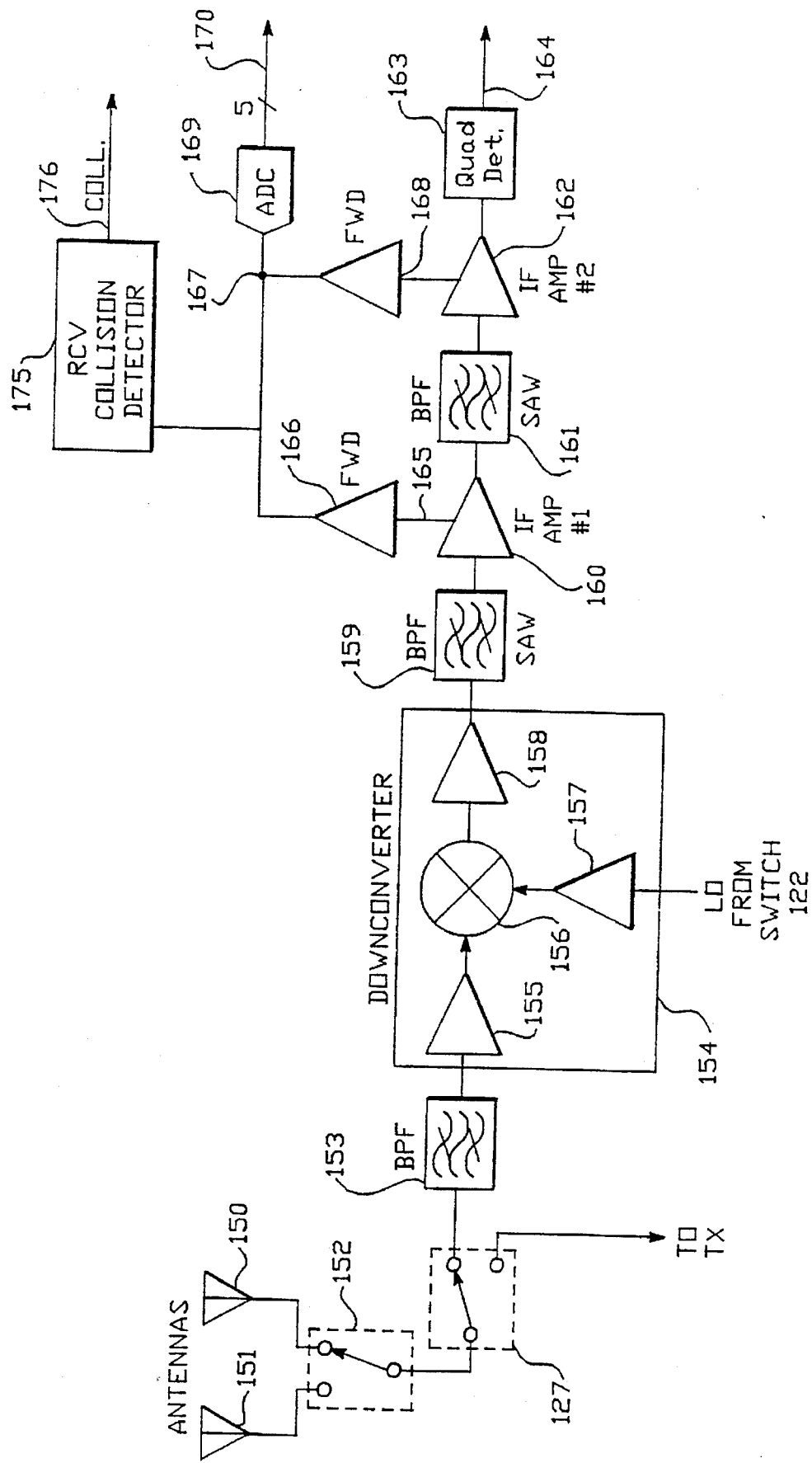
FIG. 4 is a schematic diagram of a receiver according to the present invention.

FIG. 4 is a schematic diagram of the receiver according to the present invention. The receiver includes a first antenna 150 and a second antenna 151. A switch 152 selects the antenna having the best received signal. The antennae are coupled through switch 127 to either the transmit circuitry or the receive circuitry. In the figure, the switch 127 is coupled to the receive circuitry. The output of the antenna is supplied through a bandpass filter 153 into a down converter 154. The down converter includes an amplifier 155 which drives a mixer 156. The other input of the mixer 156 is received from amplifier 157 driven by the signal on node 121 through the switch 122 shown in FIG. 3. The output of the mixer 157 is supplied through amplifier 158 to a bandpass filter 159. The output of the bandpass filter 159 is supplied through an intermediate frequency amplifier 160 to a second stage bandpass filter 161. The output of the second stage bandpass filter 161 is supplied to a second stage intermediate frequency amplifier 162. The output of the amplifier 162 is supplied through a quadrature detector 163 to produce an analog NRZ signal on line 164.

The intermediate frequency amplifier 160 also produces an output on line 165 which is coupled through a full wave detector 166 to produce an analog DC value at node 167. Node 167 is also driven by the output of amplifier 162 through full wave detector 168. Node 167 is coupled through an analog to digital converter 169 to supply a digital receive signal strength indication signal on line 170.

Node 167 is also coupled to the collision detector circuit 175 which detects intermodulation products characteristic of collisions between received data transmission signals as described below in more detail.

The receive signal strength indicator on line 170 is used to determine whether the received signal power is high enough to ensure the specified bit error rate for the receiver. The bit error rate for the receiver depends on the overall noise figure for the receiver design. However, other errors possible in the wireless environment may occur during reception of an otherwise good signal which cause the receive signal strength to fluctuate. Thus, by monitoring the receive signal strength indication on line 170, errors may be detected in a receive data packet.

As mentioned above, the receiver includes two antennae 150 and 151 to provide spatial diversity to combat multipath effects. An input bandpass filter is used to eliminate any signals outside the ISM band. After the filters and switches, the signal is fed to the down converter where it is converted to a 479.5 MHz intermediate frequency band signal. This intermediate frequency band is chosen because of the availability of small, inexpensive surface acoustic wave (SAW) filters. SAW filters have a very sharp pass band to stop band rolloff characteristics, and excellent stop band attenuation. Thus, the filters 159 and 161 are implemented using SAW filters.

The first SAW filter 159 is used to knock out any out of band signals at or below the level of the weakest desired signal for the system. The second SAW filter effectively eliminates any residual out of band energy. Both intermediate signal amplifiers 160 and 162 act not only as gain stages but as limiting amplifiers. In addition, each amplifier stage drives a full wave detector 166, 168. Summing the outputs of the full wave detectors provides a received signal strength indicator function. This received signal strength indicator function produces a voltage which is logarithmically proportional to amplitude. The voltage is digitized in the analog to digital converter 169 to give the processor an indication of the power level of the receive signal. The receive signal power level nominally ranges between −40 dBm and −75 dBm. An extra 5 dB above and below this range is allowed to account for manufacturing variations. Thus, the receive signal strength circuitry must cover a total dynamic range of 45 dB. Quantizing the signal on node 167 to 5 bit resolution gives a resolution level of 1.4 dB over this dynamic range.

The output of the quadrature detector provides an analog signal corresponding to the transmitted NRZ data. This analog signal is fed to a data and clock recovery circuit to produce a recovered NRZ data and clock.

Figure 5:
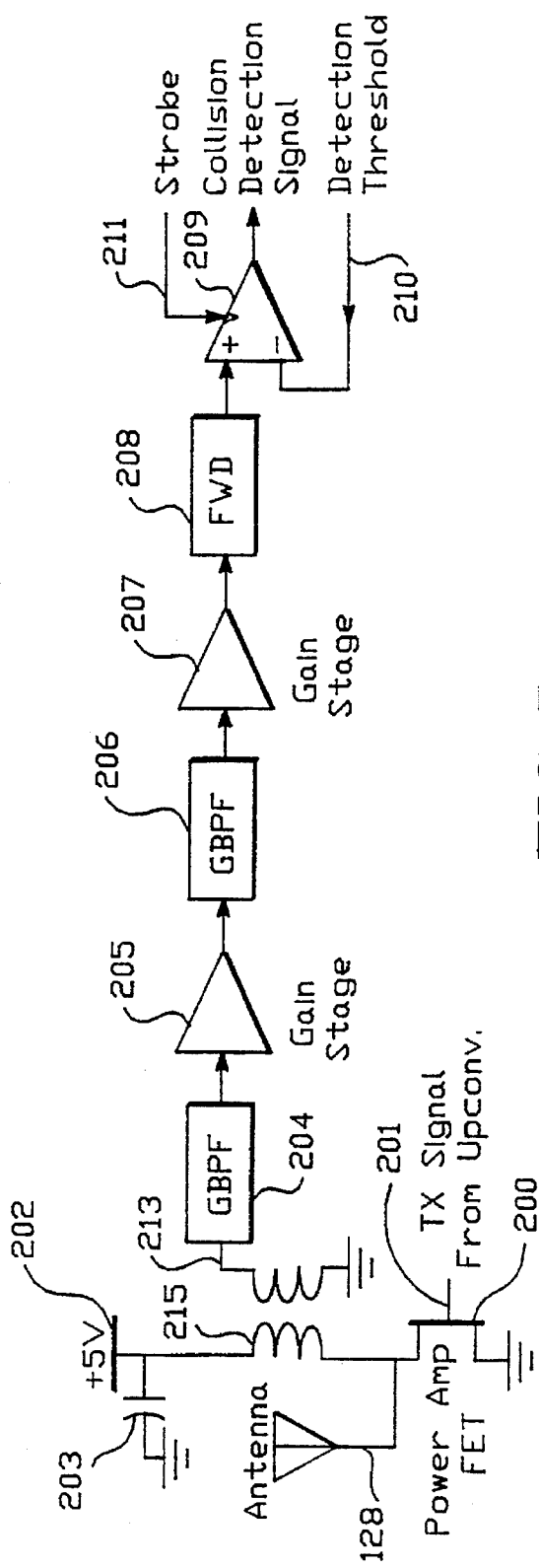
FIG. 5 is a schematic diagram of the collision detection circuitry for use in the transmitter of FIG. 3.

FIG. 5 is a schematic diagram of the collision detection circuitry for the transmitter. As can be seen in FIG. 5, the amplifier 126 of FIG. 3 includes a power amp FET transistor 200. It receives the transmit signal on its gate 201 from the output of the bandpass filter 125. The drain of the FET 200 is coupled to the antenna 128 across an inductive tap 215 to a 5 volt supply 202. The 5 volt supply 202 is also coupled across capacitor 203 to ground. The inductive tap 201 supplies a signal to the input on line 213 of a gaussian bandpass filter 204. This filter has a pass band from 2.5 MHz to 5 MHz and is designed with zeroes at adjacent channel downconverted center frequencies to attenuate signals in adjacent channels which are spaced, for example, by 14 MHz. The output of the first filter 204 is supplied to a gain stage 205 which drives a second gaussian bandpass filter 206 having similar frequency characteristics. The output of the second filter 206 is supplied to a gain stage 207 which drives a full wave detector 208. The output of the full wave detector 208 is an analog DC value which is connected to a comparator 209. A detection threshold is supplied on line 210 to the comparator 209. Also, a detection strobe 211 is supplied to the comparator 209 to control the timing of the threshold detection.

The collision detection circuit of FIG. 5 converts any frequency difference between 2.5 MHz and 5 MHz into a voltage. If there is no colliding signal, or if the colliding signal has the same frequency as the local transmitted signal, there will be no signal at the collision detection circuit output during the decision interval.

The power FET 200 has a non-linear response to colliding signals on the antenna 128. Thus, the intermodulation product signal is tapped off the amplifier drain power supply terminal and fed to a first gaussian bandpass filter 204. The action of the FET being driven to limiting by the transmit up-converter causes a non-linear response which converts any colliding signal from the antenna to a low frequency. Each gaussian bandpass filter has a pass band from approximately 2.5 MHz to 5 MHz and is designed with zeroes at adjacent channel downconverted center frequencies to attenuate signals in the adjacent channels. Two gain stages and another filter amplify and further filter the signal before it is presented to the full wave detector 208. Each gain stage has a gain of about 45 dB. If another unit transmits during the same time as a transmission from the local station, and is on the same channel, then a 5 MHz sine wave output is produced at the output of the second gain stage 207 at some point near the beginning of the packet. This response is enhanced by the wireless header as described below.

The full wave detector 208 operates as an envelope detector, producing a voltage proportional to the amplitude of the sine wave at the output of the second gain stage 207. The output of the full wave detector is sampled by an analog latching comparator. The detected signal is compared to a preset detection threshold on line 210. If the output of the full wave detector is above the detection threshold during the low to high transition of the strobe signal on line 211, which occurs at the end of each decision interval, a logic one will appear at the latching comparator output. No collision has occurred if, during every decision interval, the output of the collision detection circuit is zero.

Figure 6:
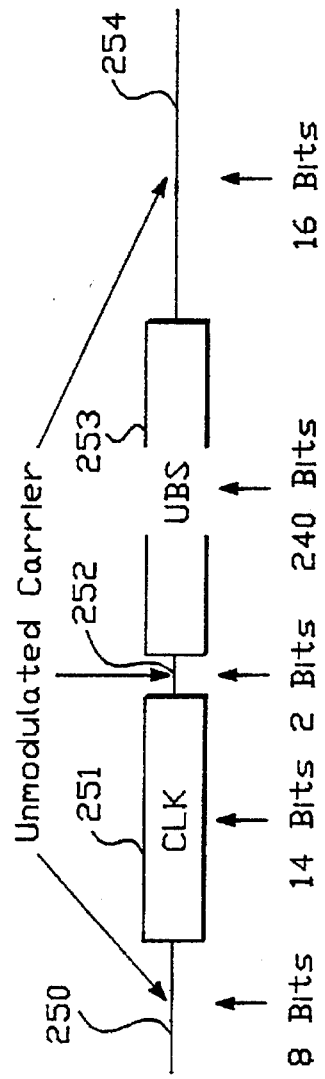
FIG. 6 is a schematic diagram of the wireless header used with the data packets according to the present invention.

As mentioned above, the wireless header is appended to each data packet to enhance the operation of the collision detection circuitry. FIG. 6 shows basic form of a wireless header according to a preferred embodiment. It includes a first segment 250 of unmodulated carrier, followed by a 14 bit segment 251 providing a clock reference field, a third segment 252 of unmodulated carrier, a fourth segment called the UBS for unambiguous bit sequence 253, and a final segment of unmodulated carrier 254. The unmodulated carrier segments 250, 252 at 254 may not be required for a given implementation.

The header starts with 8 bits of unmodulated carrier in field 250, followed by 14 bits of alternating ones (2.5 MHz above channel center frequency) and zeroes (2.5 MHz below channel center frequency). This serves the dual purpose of allowing the collision detection circuit in the transmitting wireless LAN station to initially settle, and provides a means for the receiving wireless LAN to achieve lock on the clock prior to recovering the individual bits of the UBS in field 253. A short two bit period of unmodulated carrier in field 252 provides a start of frame indicator for the receiving station so that it can decode the UBS. Each symbol of the UBS is really 16 bits long. This provides 1.6 microseconds for each symbol in the UBS to allow echoes to die out and to allow the filters in the collision detection circuit to settle.

The entire UBS is 240 bits (15 symbols) long, which allows for $2^{15}$ different UBS symbols. Note that if a UBS symbol is a "1", then 16 consecutive ones are sent. Likewise, if the UBS symbol is "0", then 16 consecutive zeroes are sent.

Finally, the preamble finishes with a period of unmodulated carrier 254. By the time the UBS is finished, the decision on whether or not a collision has been detected is made.

Figure 7:
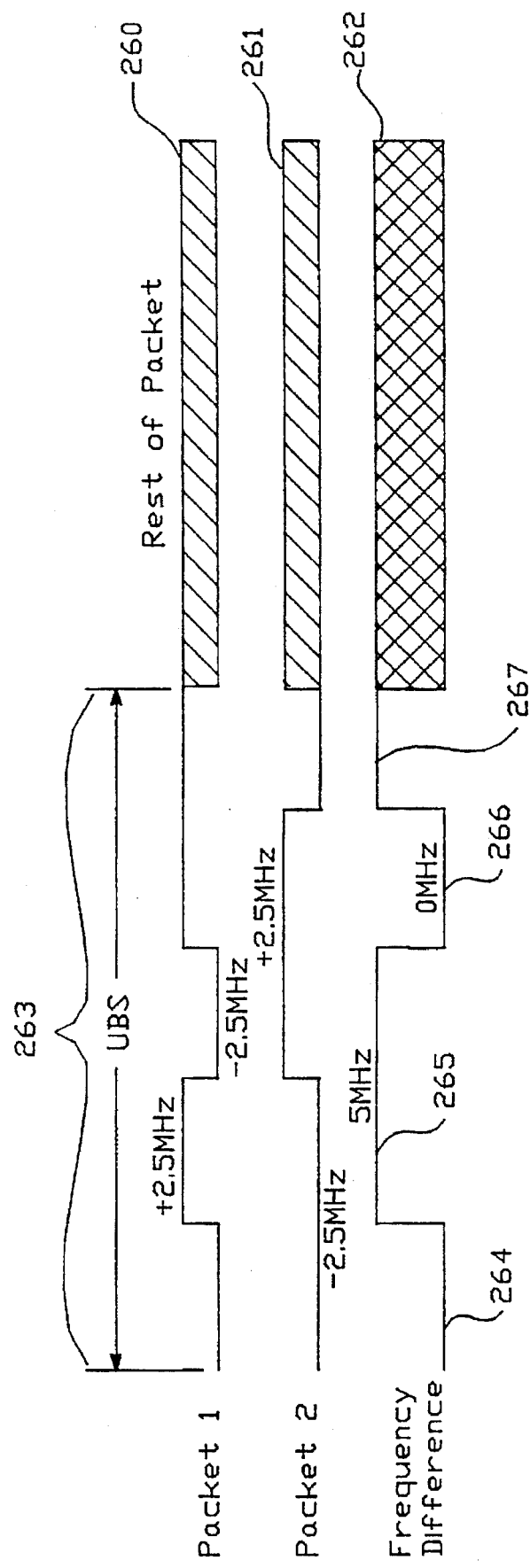
FIG. 7 illustrates the operation of the wireless header with two packets that are transmitted nearly at the same time.

FIG. 7 illustrates operation of the wireless header based on the UBS sequence. In FIG. 7, a first trace generally 260 is shown which represents a first packet (Packet 1). A second trace 261 is shown representing a second packet (Packet 2). A third trace 262 illustrates the difference frequency intermodulation product produced by collision of the two packets.

In the first trace 260, a UBS segment is illustrated in field 263. Similarly, the UBS of the second trace 261 falls in the same field for packets which are transmitted at essentially the same time.

During a first part of the sequence represented by segment 264 on trace 262, Packet 1 and Packet 2 have the same frequency and the difference frequency amplitude will be zero. A second segment 265 of trace 262, the difference in frequency between the first packet and the second packet is 5 MHz. This occurs because in Packet 1 the UBS is high during the first part of the segment 265, and the UBS of Packet 2 is low. During the second part of the segment 265, the UBS of Packet 1 is low, and the UBS in Packet 2 is high. This produces a sequence during which the amplitude of 5 MHz difference signal is high. During the segment 266 of trace 262, the frequency of the first and second packets are equal and both high. Thus the difference frequency will be low during segment 266. At the end of the sequence in segment 267, a difference frequency is produced because Packet 1 is high and Packet 2 is low. Thus, the circuit detects collisions during transmit as long as the colliding signal has a different frequency than the signal that is being transmitted at some point shortly after the start of the packet. This happens automatically during the body of the packet, since each transmitter is basically FM modulated with a different, usually uncorrelated data sequence. However, it is desirable to detect the collision as soon as possible, rather than waiting for the preamble which is usually identical for all packets in a CSMA/CD wired network, to finish.

Early detection is accomplished in the present invention by using the UBS, a pseudo-random data bit stream which is assigned to each wireless station and access point, and intended to be different for each such station. This bit stream is applied at the start of the packet to allow for collision detection early in the packet. This ensures that at least one moment during the beginning of the packet, the UBS sequences will mismatch and the intermodulation products will be enhanced and indicate a collision.

As can be seen in FIG. 7, there are a number of intervals where the two transmitted signals have different frequencies during the UBS sequence. As stated earlier, the transmitter in the preferred system uses GMSK modulation to conserve bandwidth. The figure illustrates a minimum shift key transmit signal with the frequency changing substantially instantaneously plus and minus 2.5 MHz above and below the carriers in frequency. In actuality, the action of the gaussian low pass filter would cause a GMSK signal to smoothly change from one frequency to another with no sharp edges. This action ensures that the transmitted signal is narrow band. However, for the purpose of clarity, the sharp edges are used in FIG. 7.

If the signals are not time aligned as shown in FIG. 7, then there is a slight possibility that two UBS sequences will inadvertently align during the sequence. This problem is solved by sending a short interval of unmodulated carrier (segment 254 of FIG. 6) at the end of the UBS packet. FIG. 8 illustrates this sequence. In FIG. 8, the first trace 270 represents a packet which is transmitted at time 271. The second trace 272 is illustrated which begins transmitting at time 273. Because of the inadvertent alignment of the UBS sequences for the two traces 270, 271, no frequency mismatch is detected until the end of the UBS sequence at point 274 for the first packet. Because of the short interval 275 at the end of the UBS which is set at the carrier frequency, an interval 276 in the frequency difference trace 277 is produced, at which a 2.5 MHz difference frequency is detected.

In a wireless environment attempting to detect collisions between transmissions from separate sources, the collision detection circuitry must be capable of distinguishing between echoes of the transmitted signal, and actually colliding transmissions from other sources. The transmitter will have a characteristic range, which defines a characteristic echo settling time. In a preferred system, the round trip for this signal may be on the order of a bit period or so, and produce a reflected signal which will be a different frequency than the transmitted signal from the transmitter. This will be indistinguishable from a colliding packet.

According to the present invention, echoes are handled by letting the period of each bit in the unambiguous bit sequence to be at least a few data bit periods long and controlling the timing of the collision detect strobe. This allows the system to wait long enough for echoes to return to the transmitter before determining whether a collision has occurred. For a wireless system having a range on the order of 50 feet, a settling time on the order of 100 nanoseconds will be sufficient for echoes to die out, taking into account propagation path loss for round trip echoes as well as effective radar cross section of the object causing the reflected signal. The settling time may be further limited by component settling characteristics in the circuitry, such as filter settling times.

FIG. 9 illustrates a way the echo problem is handled. In FIG. 9, a packet on trace 280 is transmitted having a UBS 281. The echo is illustrated on trace 282 which is delayed in time by an interval generally 283. As can be seen, the difference frequency trace 284 will produce an interval 285 during which a difference frequency is detectable.

The detection of collisions between echoes is avoided by strobing the collision detect comparator 209 during the intervals 286, 287, 288, and 289 which occur just prior to changing the value of the symbol in the UBS in the packet 280. Thus, a strobe during interval 286 will avoid a false collision reading due to echoes which would occur during the interval 290. Similarly, a strobe during the interval 287 avoids echoes during interval 291. The decision during interval 289 avoids echoes during the interval 292. When there is no frequency change in the UBS, such at decision interval 288, there will be no false collision signal produced by the echo 282 as indicated after the decision interval 288.

In sum, the collision detection circuit looks for the presence of any signal lying in the frequency bands between 2.5 MHz and 5 MHz on either side of the channel center frequency during transmit. The collision detection circuit is thus quite simple. In this aspect, it cannot distinguish between interference from another wireless station, the access point or a jammer. It simply knows that there is some interfering signal in close proximity to the channel center frequency. This causes the station to switch back to the receive mode where it can better evaluate the nature of the interfering signal.

The settling time of the filters within the collision detection circuitry will ultimately determine the length and position of the decision intervals shown in FIG. 9. Using the gaussian bandpass filters as illustrated in FIG. 5, a settling time of about 1.5 to 2 microseconds for the filters to fall below the minimal threshold level of detection each time the transmitted frequency is changed, is provided.

The threshold level provided by the signal on line 210 of FIG. 5 is chosen to be about one half to two thirds the maximum detected output level of the weakest desired signal. The settling time can be improved by using a larger bandwidth filter. However the upper band should be kept as low as possible to adequately attenuate out of band signals from adjacent channels, to prevent false alarms. A good alternative filter might be a transitional gaussian bandpass filter which has almost as good a pulse response as a standard gaussian filter, with better stop band attenuation. An optimum filter might be a matched filter that looks for the expected shape and frequency of the difference signals coming off the drain of the power amplifier FET, or some form of digital finite impulse response (FIR) filter.

As mentioned above, the wireless preamble needs certain characteristics to improve collision detection during transmit. It needs two frequencies to be different at some point in time, and it needs to allow sufficient time for the filters and echoes to settle out before making a collision detection decision. However, additional features may be added to the preamble. Thus, a preamble having the clock recovery field 251 is provided.

Figure 10:
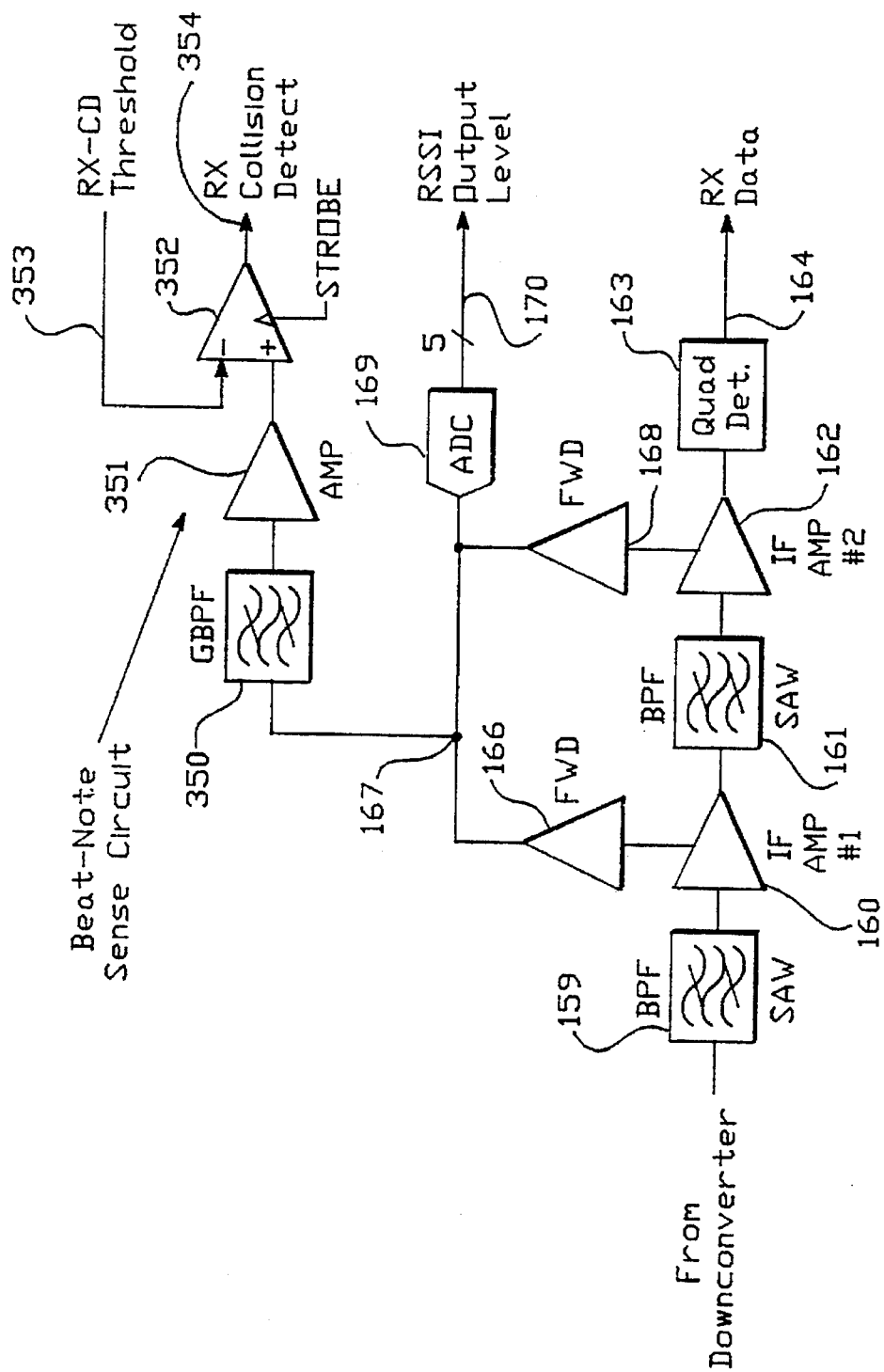
FIG. 10 is a schematic diagram of the collision detection circuitry on the receiver.

As mentioned above, the receiver also includes a collision detector as illustrated in FIG. 10. This is necessary because of the so called hidden terminal problem, in which one wireless station, such as wireless station WSTA 1 in FIG. 1 may be transmitting to the access point 13, while a second wireless station such as wireless station WSTA 2 in FIG. 1 also transmits. Because of the distance between the wireless stations, they may not be able to receive each other's signals. Thus, the access point 13 needs a receiver capable of detecting the collision.

Collisions may be detected at the access point by merely assuming that whenever an error is detected at the access point, a collision is occurring. This works well if the colliding signals are close together in amplitude. However, an interfering signal may be much lower in magnitude than other signals in the wireless network. Further, a weak signal, which might be a valid signal, may be sufficiently lower in magnitude than another, that the low magnitude signal does not cause errors in the signal.

Thus, a more sensitive way to detect collisions in wireless stations transmitting at the same time has been developed, even one that detects collisions between signals as low as −75 dBm and another at −40 dBm.

FIG. 10 illustrates a schematic diagram of a collision detection circuitry for use with the receiver of FIG. 4, as described above. In FIG. 4, the down converter 154 applies a signal to a bandpass filter 159. In FIG. 10, this bandpass filter 159 as well as the other components of the receiver are illustrated with the same reference numbers as used in FIG. 4. These elements are not described again. The collision detector includes the gaussian bandpass filter 350, which supplies an amplifier 351. The output of the amplifier 351 is coupled to 352. A receive collision threshold signal is applied on line 353 to the latching comparator 352. The latching comparator 352 produces a collision detect signal on line 354 which indicates collisions between received signals when strobed by a STROBE signal as shown.

As mentioned above, the receive signal strength indicator produces a voltage on node 167 which is logarithmically proportional to the amplitude of the received signal. The action of the full wave detectors 166 and 168 is non-linear, and produces intermodulation products that include the difference frequency produced by the UBS portion of wireless packets when received simultaneously.

When the colliding signals differ by as much as 12 dB, a 2.5 dB 5 MHz envelope variation will appear on the composite signal. When the amplitude difference between the two signals is greater than 12 dB, then this envelope variation is reduced. The collision detect circuit can be used to selectively filter and amplify this low level 5 MHz envelope fluctuation in the case when weak and strong signals are colliding. In this way, the circuitry already built in to the receiver is used to detect simultaneously transmitted signals. However, alternative systems might rely on a separate set of filters and detectors to sense the 5 MHz beat signals. The action of the SAW filters in the receiver prevent interference from adjacent and non-adjacent channels. Thus a simple filter can extract a 5 MHz frequency difference signal.

The receive collision detect circuitry is only necessary in the environments in which a hidden terminal is possible. When a system guarantees that all possible transmitters in the network can receive the signal from others, then a transmit only collision detect system may be sufficient.

Figure 13:
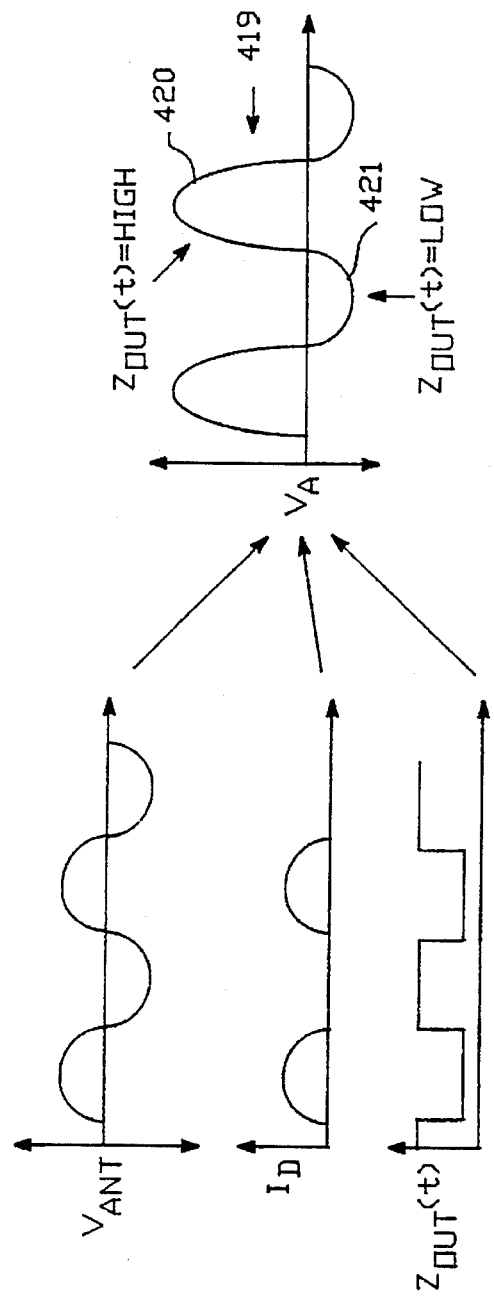
FIG. 13 are signal graphs showing the mixing action on the drain of an FET.
Figure 14:
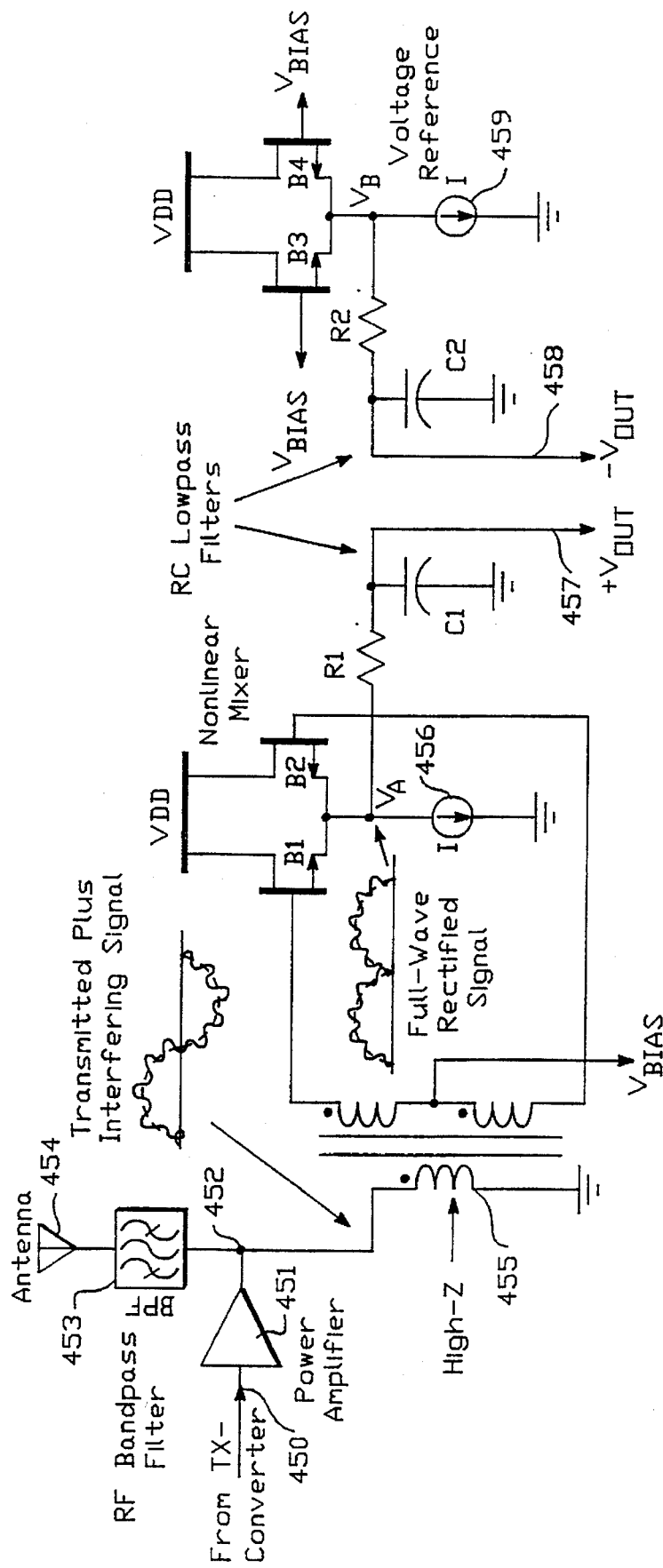
FIG. 14 illustrates the process of detecting collisions using a non-linear mixer in a wireless transmitter.
Figure 15:
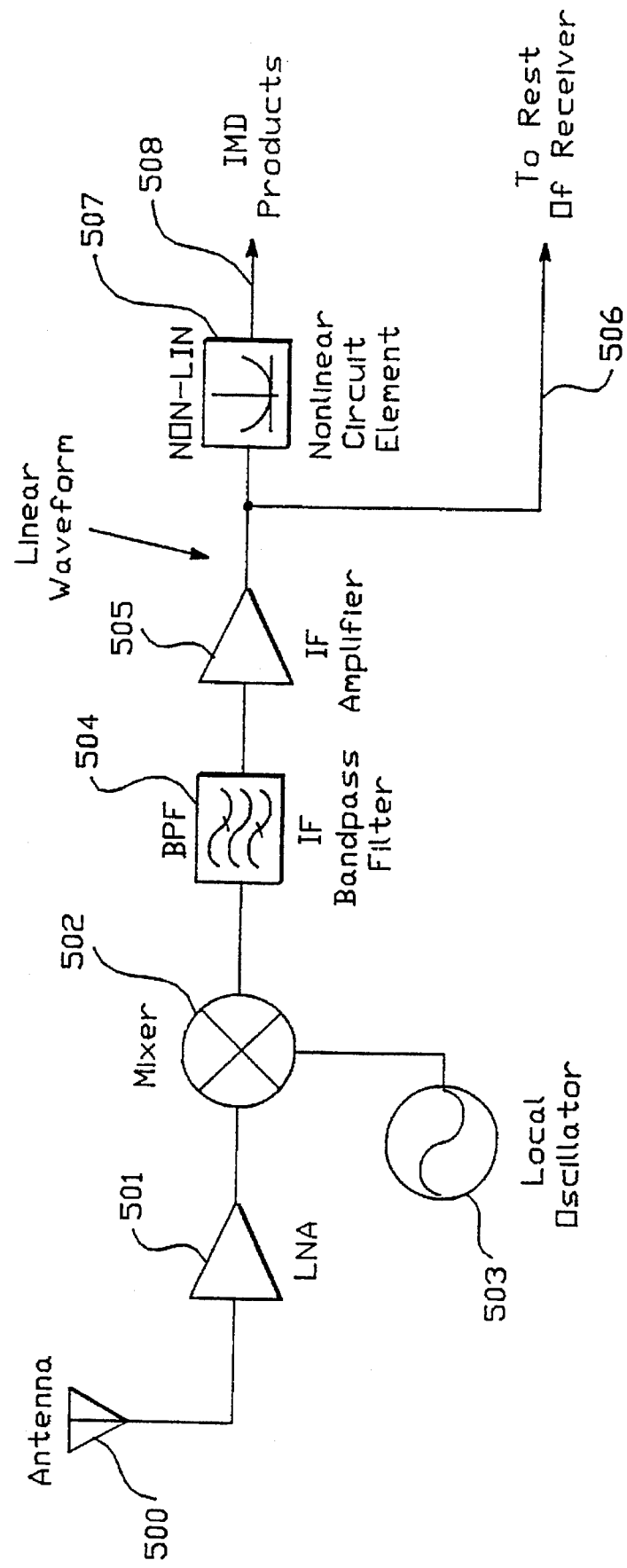
FIG. 15 is a schematic diagram illustrating the principle of collision detection in a receiver.
Figure 16:
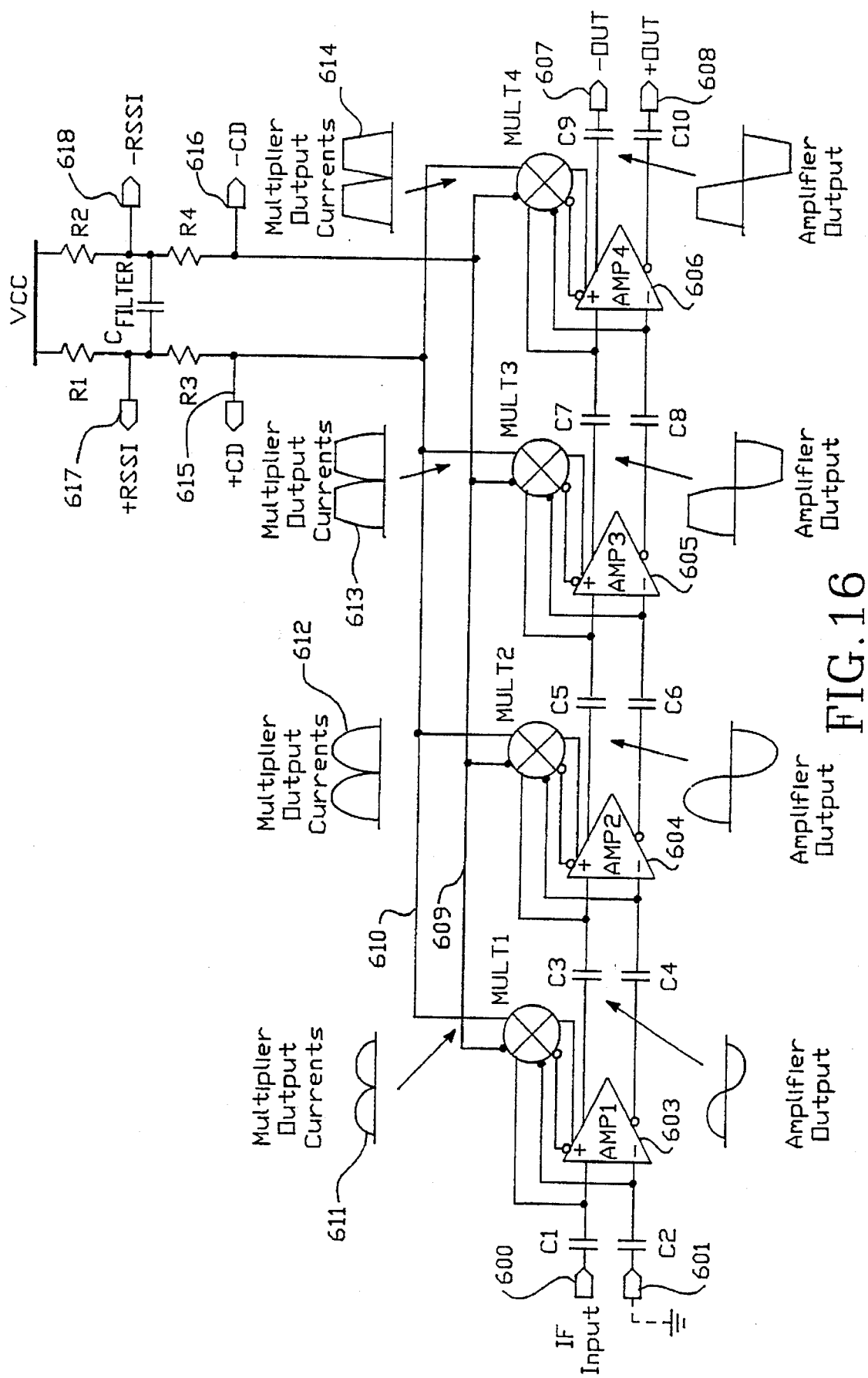
FIG. 16 provides a more detailed schematic diagram of the amplifier and full wave detecting stages in the receive collision detect circuitry of FIG. 10.
Figure 17:
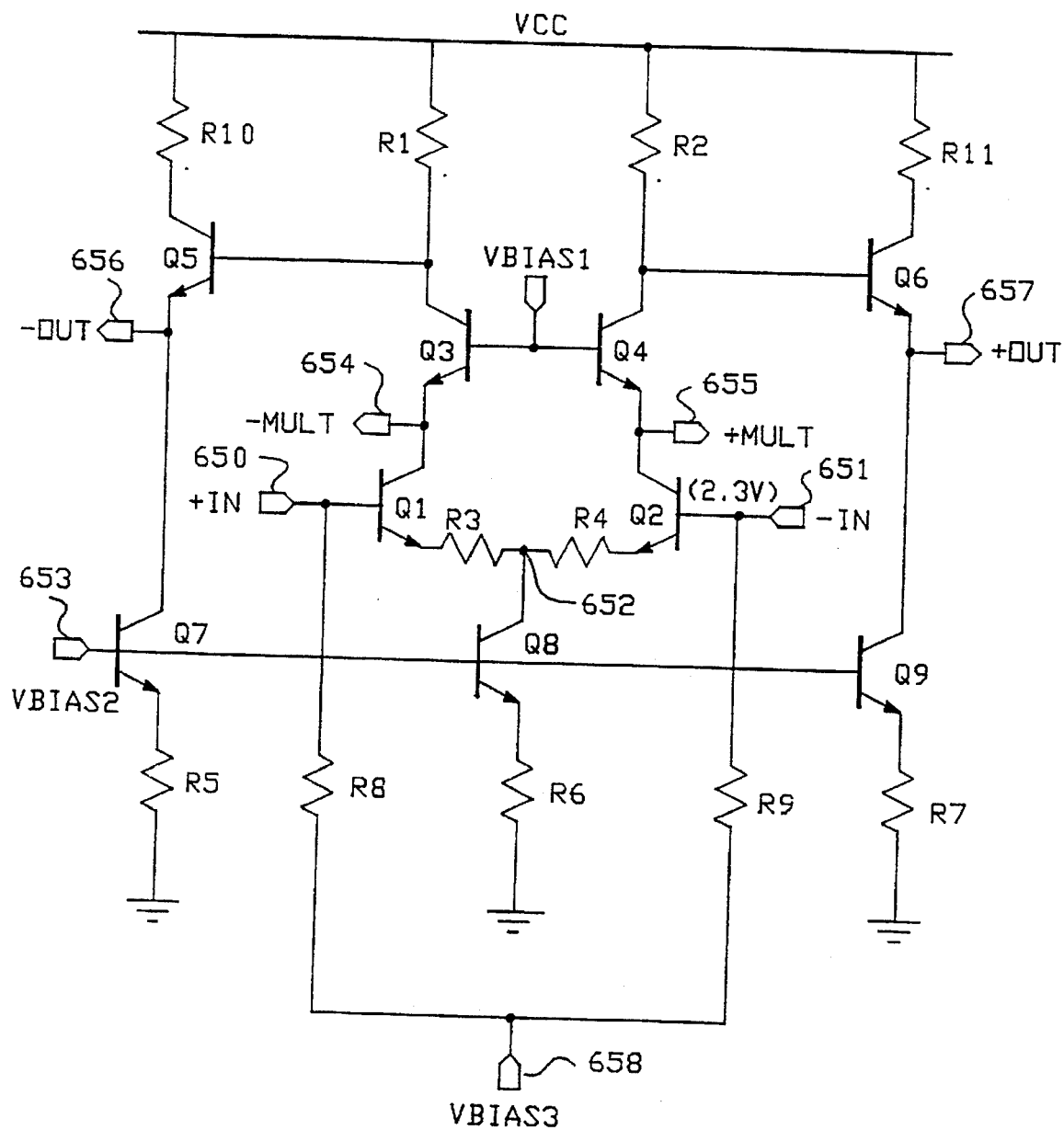
FIG. 17 is a circuit level schematic of a limiting amplifier used in the circuit of FIG. 16.

With reference to FIGS. 11–18, more details concerning the collision detection process of the present invention are provided. FIGS. 11–14 are related to the process of detecting collisions based on producing intermodulation products. FIGS. 15–17 address the receiver collision detection principle, and a detailed implementation of circuitry for detecting received collisions.

Figure 11:
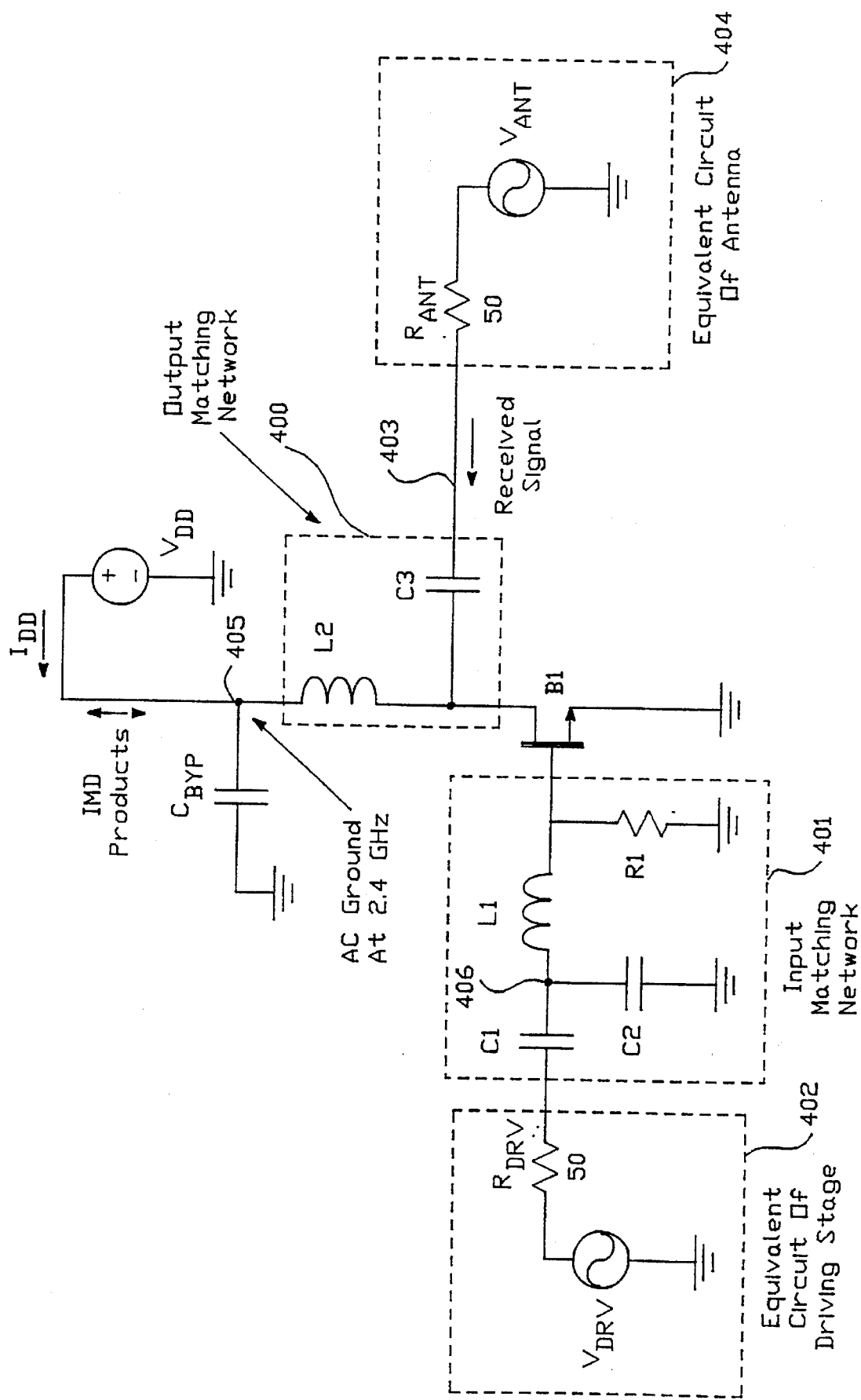
FIG. 11 is a schematic diagram illustrating the process of sensing collisions using the drain of a FET.

FIG. 11 illustrates the process of sensing collisions via the drain of a power MESFET in the amplifying stage driving the output antenna on the transmitter. Thus, the circuit includes a power MESFET B1 having its source coupled to ground and its drain connected to an output matching network 400. The gate of the MESFET B1 is connected to an input matching network 401. The input matching network 401 is driven by the driving stage of the amplifier, which is represented in FIG. 11 by an equivalent circuit 402.

The output matching network 400 is coupled to line 403 from the antenna, which is represented by the equivalent circuit 404.

Also, the output matching network 400 is connected between the MESFET B1 and node 405 at which a bypass capacitor $C_{BYP}$ is connected. Bypass capacitor $C_{BYP}$ has a value of about 10–100 picoFarads to establish an AC ground at about 2.4 GHz. Intermodulation (IMD) products are produced at node 405 from the drain of MESFET B1 in the current $I_{DD}$ from the power supply $V_{DD}$.

As can be seen, the equivalent circuit 402 of the driving stage includes a voltage source $V_{DRV}$, and a resistor $R_{DRV}$ of about 50 ohms in a matched 50 ohm circuit. The input matching network 401 includes the capacitor C1 which is connected between the resistor $R_{DRV}$ and node 406. Capacitor C2 is connected between node 406 and ground. An inductor L1 is connected between node 406 and the gate of MESFET B1. Also, the resistor R1 is connected between the gate of MESFET B1 and ground.

The output matching network 400 includes an inductor L2 connected between the drain of MESFET B1 and node 405. Also, the output matching network 400 includes a capacitor C3 connected between the drain of the MESFET B1 and line 403. The equivalent circuit of the antenna 404 matches the equivalent circuit of the driving stage, including a 50 ohm resistor $R_{ANT}$, and a voltage source $V_{ANT}$.

Figure 12:
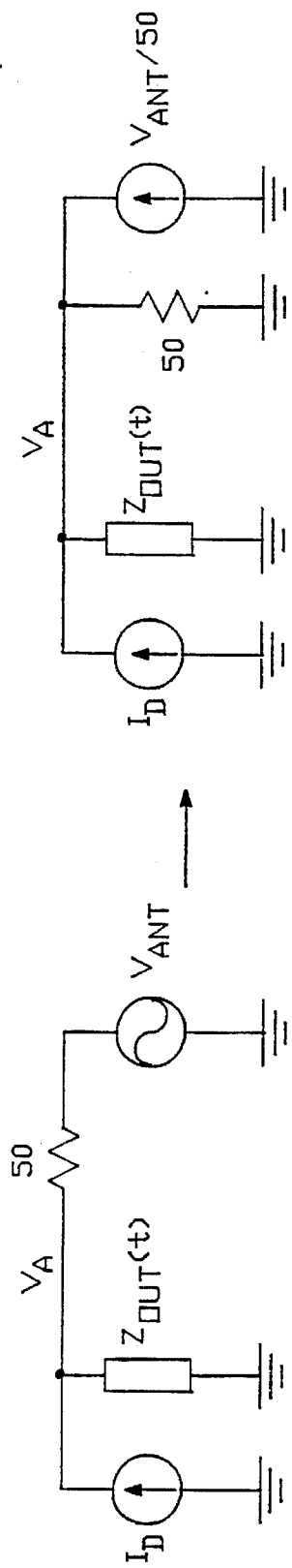
FIG. 12 is an equivalent circuit diagram used in analyzing the mixing action on the drain of a FET.

The drain node of the MESFET B1 performs the mixing action as illustrated with respect to FIGS. 12 and 13. FIG. 12 illustrates the equivalent circuit for the voltage $V_A$ across the antenna. It includes a current source $I_D$, and an impedance $Z_{OUT}(t)$ which varies with time. The antenna equivalent circuit includes the 50 ohm resistor and the voltage source $V_{ANT}$. This equivalent circuit can also be represented as illustrated by FIG. 12, by an equivalent circuit including the current source $I_D$, the impedance $Z_{OUT}(t)$, and an antenna equivalent circuit based on a 50 ohm resistor connected between $V_A$ and ground, and a current source $V_{ANT}/50$. The voltage $V_A$ can be calculated as shown in FIG. 12 at equation 1.

FIG. 13 provides a simplified illustration of the result of the operation of the equivalent circuit when both signals are near the same frequency. In FIG. 13, a first graph illustrates the voltage $V_{ANT}$ as a periodic signal. A second graph illustrates the current $I_D$ as a rectified signal. Also, the impedance $Z_{OUT}(t)$ is illustrated in FIG. 13 as an offset square wave. When equation 1 is applied to calculate $V_A$, then the waveform 419 of FIG. 13 is produced. When the impedance $Z_{OUT}(t)$ is high, then $V_A$ has the enlarged shape 420, as illustrated in FIG. 13. Conversely, when the impedance $Z_{OUT}(t)$ is low, then the attenuated shape 421 is produced. Waveform $V_A$ thus includes the intermodulation products used by the mixing action at the drain of the driving MESFET.

An alternative design is shown in FIG. 14 for producing intermodulation products using a non-linear mixer. In the circuit of FIG. 14, a transmit signal from the upconverter is provided on line 450. The signal is supplied through power amplifier 451 to node 452. Node 452 is coupled through a RF bandpass filter 453 to the transmit antenna 454. Also, node 452 is coupled to a high impedance transformer 455. The output side of the high impedance transformer is tapped at the center with a bias voltage $V_{BIAS}$. A first side of the transformer is connected to the gate of FET B1, while a second side of the transformer 455 is coupled to the gate of FET B2. The sources of FET's B1 and B2 are coupled together at current source 456. The drains of FET's B1 and B2 are coupled to the supply voltage $V_{DD}$. On the common source node of FET's B1 and B2, a fullwave rectified signal $V_A$ is produced. This signal is supplied across resistor R1 as $+V_{OUT}$ on line 457. A capacitor C1 is connected between line 457 and ground.

A reference voltage is produced by FET's B3 and B4, which have their sources coupled to node $V_B$, and their gates connected to a bias potential $V_{BIAS}$. The drains of FET's B3 and B4 are coupled to the supply voltage $V_{DD}$. The node $V_B$ at the common sources of FET's B3 and B4 is coupled across resistor R2 to line 458 as the $-V_{OUT}$ signal. Capacitor C2 is connected between line 458 and ground. Also, current source 459 is connected between node $V_B$ and ground. The circuit of FIG. 14 is particularly suited to implementation on a monolithic microwave integrated circuit. The non-linear mixing action provided by the common source FET's B1 and B2 produces the intermodulation products in the signal $V_A$ necessary for collision detection as described above.

FIGS. 15 through 18 illustrate the receiver collision detection process. In FIG. 15, the basic principle is illustrated. A receive signal is detected at antenna 500 and is supplied through a low noise amplifier 501 to mixer 502. Local oscillator 503 is mixed with the signal received from the antenna, at the mixer 502. The resulting signal is supplied through an intermediate frequency bandpass filter 504 to an intermediate frequency amplifier 505. A linear waveform is produced at the output of the amplifier 505 and coupled across line 506 to the rest of the receiver circuitry. Intermodulation products are produced by supplying the linear waveform at the output of the amplifier 505 through a non-linear circuit element 507. The output of the circuit element 507 includes the intermodulation products on line 508, which will then be supplied through a low pass filter and detector circuitry to produce a collision detect signal at the receiver.

Figure 18:
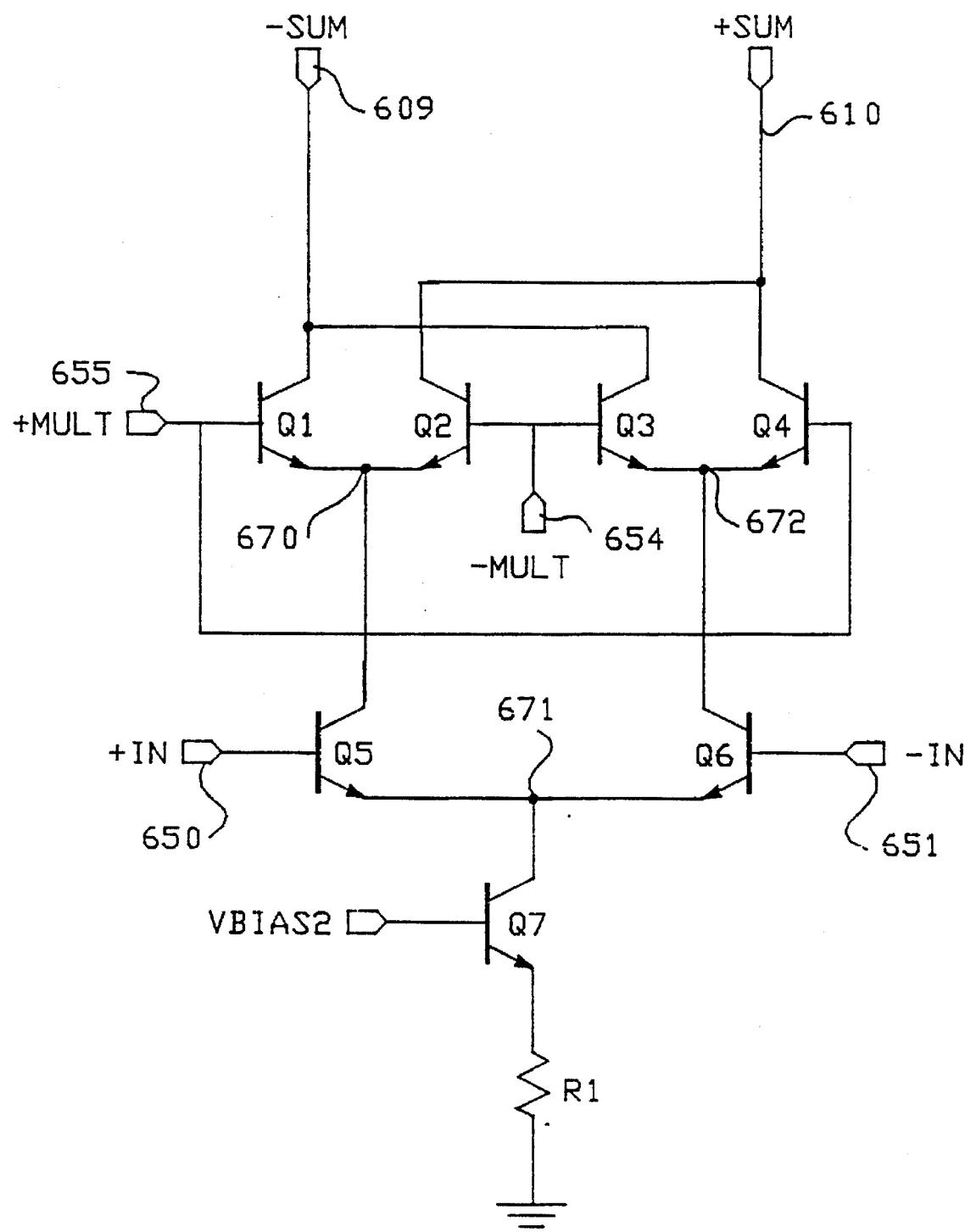
FIG. 18 is a circuit level schematic of a multiplier used in the circuit of FIG. 16.

FIGS. 16 through 18 illustrate a preferred embodiment of the amplifiers and the fullwave detectors, such as amplifier 162 and fullwave detector 168, used in the receiver collision circuitry of FIG. 10. Thus, an intermediate frequency amplifier, such as amplifier 162, may include a four stage circuit as shown in FIG. 16. It receives the intermediate frequency input as a balanced two line signal on lines 600 and 601. Lines 600 and 601 are AC coupled through capacitors C1 and C2, respectively, to a first limiting amp 603. The outputs of the limiting amp 603 include true and compliment versions, and are AC coupled through capacitors C3 and C4 to a second limiting amp 604. Similarly, limiting amp 604 drives the input to limiting amp 605 through AC coupling capacitors C5 and C6. The outputs of amplifier 605 are AC coupled through capacitor C7 and C8 to the inputs of amplifier 606. The outputs of the amplifier 606 are AC coupled through capacitors C9 and C10 to the amplifier output stages on lines 607 and 608. The circuit schematic for one of the amplifier stages is described with respect to FIG. 17.

The full wave detector consists of multiplier circuits MULT1, MULT2, MULT3, and MULT4. The first multiplier MULT1 receives as input, the signal supplied to the input of the first amplifier 603, and a signal supplied at an output of the first amplifier 603. The signals on the multiplier output terminals on lines 609 and 610 have the shape illustrated at trace 611.

The second multiplier MULT2 has its inputs connected to the inputs of the second amplifier 604, and to outputs of the second amplifier 604. The outputs of the multiplier MULT2 are connected to lines 609 and 610 and produce signals having the shape illustrated at trace 612. The multiplier MULT3 is connected to the inputs and outputs of the third amplifier 605, and has its outputs connected to line 609 and 610. The outputs of the third multiplier MULT3 have the shape illustrated at trace 613. Finally, the fourth multiplier MULT4 is connected across the fourth amplifier 606. Its outputs are connected to lines 609 and 610 and produce a signal having a shape illustrated at trace 614. The inputs to the collision detect comparator are provided on lines 615 and 616 which are connected to lines 609 and 610. Line 615 is connected to the power supply $V_{CC}$ through resistors R3 and R1. Similarly, line 616 is connected to the power supply $V_{CC}$ through resistors R4 and R2. At the node between resistors R3 and R1, a receive signal strength indication RSSI output is provided on line 617. Similarly, at the node between resistors R2 and R4, the other RSSI output is provided on line 618. A capacitor $C_{FILTER}$ is connected between lines 617 and 618.

FIG. 17 provides a schematic diagram of a limiting amplifier, such as might be used as amplifiers 603 through 606 in the circuit of FIG. 16. The inputs to the amplifier provided on lines 650 and 651 at the base of transistors Q1 and Q2 as inputs to the multiplier. The input terminals on lines 650 and 651 are connected across resistors R8 and R9, respectively, to a bias potential $V_{BIAS3}$ at node 658. The emitters of transistors Q1 and Q2 are connected through resistors R3 and R4, respectively, to node 652. Node 652 is connected through the current source transistor Q8 and resistor R6 to ground. Current source transistor Q8 has its base connected to a bias potential $V_{BIAS2}$ on line 653.

The collector of transistor Q1 provides the minus output (−MULT) the multiplier on line 654, and the collector of transistor Q2 provides the positive output (+MULT) multiplier on line 655.

The collector of transistor Q1 is connected to the emitter of transistor Q3, which has its collector coupled across resistor R1 to the supply $V_{CC}$. The base of transistor Q3 is connected to the bias potential $V_{BIAS1}$. The collector of transistor Q2 is connected to the emitter of transistor Q4 which has its collector connected across resistor R2 to the supply voltage $V_{CC}$. The base of transistor Q4 is connected to the bias $V_{BIAS1}$.

The minus output (−OUT) of the amplifier is provided through emitter follower transistor Q5 which has its base connected to the collector of transistor Q3, and its emitter connected to line 655 providing the minus output. The positive output (+OUT) is provided through emitter follower Q6 which has its base connected to the collector of transistor Q4, and its emitter connected to line 657. The collector of the transistor Q5 and the collector of transistor of Q6 are connected to the supply voltage $V_{CC}$ across resistors R10 and R11, respectively.

The emitters of transistors Q5 and Q6 are coupled to current source transistors Q7 and Q9, respectively. The emitter of transistor Q7 is connected across resistor R5 to ground. The base of transistor Q7 is connected to the bias voltage $V_{BIAS2}$ on line 653. Similarly, the emitter of transistor Q9 is connected across resistor R9 to ground and the base of transistor Q9 is connected to the signal $V_{BIAS2}$.

The multiplier used as the fullwave detector, such as multiplier MULT4 in FIG. 16, is shown in FIG. 18. This circuit consists of transistors Q1 and Q2 which have their emitters coupled to node 670, which is connected to the collector of transistor Q5. The emitter of transistor Q5 is connected to node 671. Node 671 is connected to the collector of current source transistor Q7, which has its emitter connected across resistor R1 to ground. The base of transistor Q7 is coupled to the bias potential $V_{BIAS2}$. Also, an emitter coupled pair consisting of transistors Q3 and Q4 is included. The emitters of transistors Q3 and Q4 are connected to node 672. Node 672 is connected to the collector of transistor Q6. The emitter of transistor Q6 is connected to node 671. The inputs (+IN, −IN) to the multiplier are connected to the first stage (Q5, Q6) of emitter coupled pairs as illustrated. The positive multiplier input (+MULT) is supplied on line 673 to the bases of transistors Q1 and Q4. The negative multiplier input (−MULT) is connected on line 674 to the bases of transistors Q2 and Q3.

The output of the multiplier is supplied on the minus sum (−SUM) line 609 and the plus sum (+SUM) line 610 to the load illustrated in FIG. 16 consisting of the resistors R1 and R4 and the capacitor $C_{FILTER}$.

In sum the present invention provides a collision detection system for both receivers and transmitters in a wireless network. Collision detection allows implementation of a full carrier sense multiple access with collision detection protocol in the wireless environment providing maximum network throughput. Further, the system is relatively simple to implement, sensitive and robust.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for a station on a wireless communication channel, which detects collisions between data transmissions in the wireless communication channel, comprising:

a detector which detects mixing products of colliding data transmissions at the station; and signal processing resources, coupled to the detector, which indicate collisions between data transmissions based upon characteristics of the mixing products, wherein the data transmissions comprise a frequency modulated carrier having a center frequency, a low frequency below the center frequency representing a first data value, and a high frequency above the center frequency representing a second data value, and the signal processing resources are responsive to a mixing product based on a difference between the low frequency and the high frequency.

2. An apparatus for a station on a wireless communication channel, which detects collisions between data transmissions in the wireless communication channel, comprising:

a detector which detects mixing products of colliding data transmissions at the station; and signal processing resources, coupled to the detector, which indicate collisions between data transmissions based upon characteristics of the mixing products, wherein the station includes a transmitter, the transmitter including an amplifier having a nonlinear response to colliding signals which produces intermodulation products, and the detector comprises:

a filter coupled to the transmitter which passes an intermodulation product characteristic of colliding data transmissions to the signal processing resources.

3. The apparatus of claim 2, wherein the signal processing resources comprise circuitry which generates a collision detect signal in response to amplitude of the intermodulation product passed by the filter.

4. The apparatus of claim 3, wherein the data transmissions comprise a frequency modulated carrier having a nominal center frequency, a low frequency below the nominal center frequency representing a first data value, and a high frequency above the nominal center frequency representing a second data value, and the intermodulation product passed by the filter is based on a difference between the low frequency and the high frequency.

5. An apparatus for a station on a wireless communication channel, which detects collisions between data transmissions in the wireless communication channel, comprising:

a detector which detects mixing products of colliding data transmissions at the station; and signal processing resources, coupled to the detector, which indicate collisions between data transmissions based upon characteristics of the mixing products, wherein the station comprises a receiver, and the detector comprises a nonlinear device coupled to the receiver which produces intermodulation products, and a filter coupled to the nonlinear device which passes an intermodulation product characteristic of colliding data transmissions to the signal processing resources.

6. The apparatus of claim 5, wherein the signal processing resources comprise circuitry which generates a collision detect signal in response to amplitude of the intermodulation product passed by the filter.

7. The apparatus of claim 6, wherein the data transmissions comprise a frequency modulated carrier having a nominal center frequency, a low frequency below the nominal center frequency representing a first data value, and a high frequency above the nominal center frequency representing a second data value, and the intermodulation product passed by the filter is based on a difference between the low frequency and the high frequency.

8. A station for a wireless link in a network, comprising:

a transmitter to supply a data transmission from the station;

a transmit collision detector, coupled to the transmitter, which detects collisions between the data transmission from the station and data transmissions from other sources received during the transmission;

a receiver to receive data transmissions from other sources;

a receive collision detector, coupled to the receiver, which detects collisions between data transmissions at the station from other sources.

9. The station of claim 8, wherein the transmitter includes a nonlinear device which produces intermodulation products characteristic of colliding data transmissions, and the transmit collision detector is responsive to the intermodulation products.

10. The station of claim 8, wherein the transmitter includes a transistor with a collector or drain circuit which produces intermodulation products in the collector or drain circuit characteristic of colliding data transmissions, and the transmit collision detector is responsive to the intermodulation products.

11. The station of claim 8, wherein the transmitter includes:

an amplifier driving the data transmission;

an input which receives a data packet for transmission;

resources coupled to the input which add a header to the data packet, the header having characteristics monitored by the transmit collision detector and the receive collision detector, and which supply a data transmission signal to the amplifier in response to the header and the data packet.

12. The station of claim 11, wherein the header comprises a sequence assigned to the transmitter intended to be different than sequences assigned to other transmitters in the wireless link, so that collisions occurring during transmission of the sequence have intervals during which a mismatch occurs between the colliding signal and the data transmission.

13. The station of claim 12, wherein the data transmission has a bit period during which a single bit is transmitted, and the transmitter has a characteristic settling time; and wherein the header comprises a sequence of symbols, each symbol having a data value and lasting a plurality of bit periods longer than the settling time.

14. The station of claim 13, wherein the header further includes a clock reference field.

15. The station of claim 8, wherein the transmit collision detector comprises:

a filter coupled to the transmitter which passes an intermodulation product characteristic of colliding data transmissions to the signal processing resources; and the receive collision detector comprises a filter coupled to the transmitter which passes an intermodulation product characteristic of colliding data transmissions to the signal processing resources.

16. The station of claim 15, wherein the signal processing resources comprise circuitry which generates a collision detect signal in response to amplitude of the intermodulation product passed by the filters in the transmit and receive collision detectors.

17. The station of claim 16, wherein the data transmissions comprise a frequency modulated carrier having a nominal center frequency, a low frequency below the nominal center frequency representing a first data value, and a high frequency above the nominal center frequency representing a second data value, and the intermodulation product passed by the filters is based on a difference between the low frequency and the high frequency.

18. A station for a wireless link in a network, comprising:

a transmitter, including an amplifier coupled to supply a data transmission in response to a data transmission signal;

an input which receives a digital data packet for transmission;

resources which apply a header to the digital data packet;

frequency modulation circuitry coupled to the input which supplies a data transmission signal to the amplifier which comprises a carrier frequency modulated in response to the header and the digital data packet;

a transmit collision detector, coupled to the transmitter, which detects mixing products of the data transmission from the amplifier and signals from other sources received during the transmission;

a receiver;

signal processing resources, coupled to the transmit collision detector, which indicate collisions between data transmissions based upon characteristics of the mixing products.

19. The station of claim 18, wherein the frequency modulation circuitry produces gaussian minimum shift keying (GMSK) modulation.

20. The station of claim 18, wherein the data transmission signal comprises a carrier having a nominal center frequency, a low frequency below the nominal center frequency representing a first data value, and a high frequency above the nominal center frequency representing a second data value, and the mixing product detected by the detector is based on a difference between the low frequency and the high frequency.

21. The station of claim 18, wherein the transmit collision detector comprises:

a filter coupled to amplifier in the transmitter which passes the mixing product; and wherein the signal processing resources comprise circuitry which generates a collision detect signal in response to amplitude of the mixing product passed by the filter.

22. The station of claim 21, including a nonlinear device which produces intermodulation products of data transmissions received from other sources, and a receive collision detector, coupled to the receiver, which detects intermodulation products characteristic of collisions between data transmissions from other sources; and wherein the receive collision detector comprises:

a filter coupled to the nonlinear device in the receiver which passes the intermodulation product; and wherein the signal processing resources comprise circuitry which generates a collision detect signal in response to amplitude of the intermodulation product passed by the filter.

23. The station of claim 18, wherein the header comprises a sequence having characteristics which enhance the mixing products detected by the detector.

24. The station of claim 23, wherein the header comprises a sequence assigned to the station intended to be different than sequences assigned to other stations in the wireless link, so that collisions occurring during transmission of the sequence have intervals during which a mismatch occurs between the colliding signal and the data transmission.

25. The station of claim 24, wherein the data transmission has a bit period during which a single bit is transmitted, and the station has a characteristic settling time, and wherein the header comprises a sequence of symbols, each symbol having a data value and lasting a plurality of bit periods longer than the settling time.

26. The station of claim 25, wherein the header further includes a clock reference field.

27. A method for detecting collisions in a station on a wireless link of a network operating a carrier sense multiple access with collision detection (CSMA/CD) protocol, comprising:

applying a header to data packets to be transmitted on the wireless link which includes a collision detect sequence for the station including collision detect symbols having a duration longer than a characteristic settling time for the wireless link;

producing mixing products in the station between the collision detect sequence in data transmissions by the station and signals from other sources; and processing the mixing products to detect collisions between data transmissions.

28. The method of claim 27, wherein the step of processing includes sampling the mixing products in an interval of time near a change in value in the collision detect symbols of the header during data transmissions by the station on the wireless communication channel.

29. The method of claim 28, wherein the interval of time occurs just prior to a change in value in the collision detect symbols.

30. A method for detecting collisions in a station on a wireless link of a network operating a carrier sense multiple access with collision detection (CSMA/CD) protocol, comprising:

applying a header to data packets to be transmitted on the wireless link;

producing mixing products in the station between data transmissions by the station and signals from other sources; and processing the mixing products to detect collisions between data transmissions, wherein the header comprises a sequence of symbols assigned to the station intended to be different than sequences assigned to other stations in the wireless link, so that collisions occurring during transmission of the sequence have intervals during which a mismatch occurs between the colliding signal and the data transmission.

31. The method of claim 30, wherein the data transmission has a bit period during which a single bit is transmitted, and the station has a characteristic settling time, and wherein the header comprises a sequence of symbols, each symbol having a data value and lasting a plurality of bit periods longer than the settling time.

32. The method of claim 31, wherein the header further includes a clock reference field.

33. The method of claim 30, wherein the step of processing includes sampling the mixing products in an interval of time near a change in value in the symbols of the sequence of symbols in the header during data transmissions by the station on the wireless communication channel.

34. The method of claim 33, wherein the interval of time occurs just prior to a change in value in the symbols.

35. A method for detecting collisions in a station on a wireless link of a network operating a carrier sense multiple access with collision detection (CSMA/CD) protocol, comprising:

applying a header to data packets to be transmitted on the wireless;

producing mixing products in the station between the header in data packets transmitted by the station and signals from other sources; and processing the mixing products to detect collisions between data transmissions, wherein the data transmission comprises a carrier having a nominal center frequency, a low frequency below the nominal center frequency representing a first data value, and a high frequency above the nominal center frequency representing a second data value, and the mixing product produced is based on a difference between the low frequency and the high frequency.

36. The method of claim 35, wherein the step of producing comprises filtering signals at the stations to pass the mixing product; and the step of processing includes generating a collision detect signal in response to amplitude of the mixing product passed by the step of filtering.

* * * * *